(12) United States Patent
Niida

(10) Patent No.: US 9,584,714 B2
(45) Date of Patent: Feb. 28, 2017

(54) IMAGING APPARATUS, CLIENT APPARATUS, IMAGING SYSTEM, METHOD FOR CONTROLLING IMAGING APPARATUS, METHOD FOR CONTROLLING CLIENT APPARATUS, AND METHOD FOR CONTROLLING IMAGING SYSTEM FOR CONTROLLING SENSITIVITY USING THE INSERTION AND RETRACTION OF AN INFRARED CUT FILTER INTO AND FROM AN OPTICAL PATH

(71) Applicant: CANON KABUSHIKI KAISHA, Tokyo (JP)

(72) Inventor: Mitsuo Niida, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 14/776,605

(22) PCT Filed: Mar. 10, 2014

(86) PCT No.: PCT/JP2014/001334
§ 371 (c)(1),
(2) Date: Sep. 14, 2015

(87) PCT Pub. No.: WO2014/141677
PCT Pub. Date: Sep. 18, 2014

(65) Prior Publication Data
US 2016/0037049 A1 Feb. 4, 2016

(30) Foreign Application Priority Data
Mar. 15, 2013 (JP) .................................. 2013-053594

(51) Int. Cl.
H04N 5/232 (2006.01)
H04N 5/225 (2006.01)
(Continued)

(52) U.S. Cl.
CPC ........... *H04N 5/23206* (2013.01); *G03B 7/18* (2013.01); *G03B 11/00* (2013.01); *H04N 5/2254* (2013.01);
(Continued)

(58) Field of Classification Search
CPC ............. H04N 5/23206; H04N 5/2254; H04N 5/23245; H04N 5/2351; H04N 5/238; H04N 5/33; H04N 5/243; G03B 7/18; G03B 11/00
See application file for complete search history.

(56) References Cited

U.S. PATENT DOCUMENTS 7,619,680 B1 * 11/2009 Bingle ................... B60R 11/04
348/342
7,885,535 B2 * 2/2011 Horowitz .............. G01J 1/4228
396/221
(Continued)

FOREIGN PATENT DOCUMENTS

JP 2001-075140 A 3/2001
JP 2007-151003 A 6/2007
(Continued)

OTHER PUBLICATIONS

International Search Report and Written Opinion for PCT/JP2014/001334 and notification of transmittal of the ISR/WO, dated May 27, 2014.

*Primary Examiner* — Nicholas Giles
(74) *Attorney, Agent, or Firm* — Canon USA, Inc. I.P. Division

(57) ABSTRACT

An imaging apparatus connectable to a client apparatus via a network includes an imaging optical system, an image sensor, an infrared cut filter (IRCF) driving circuit that inserts and retracts an IRCF into and from an optical path of the imaging optical system, and a communication circuit that receives, from the client apparatus, an automatic insertion and retraction control command for causing the imaging (Continued)

apparatus to automatically control insertion and retraction of the IRCF and additional information about insertion and retraction of the IRCF. The communication circuit transmits, to the client apparatus, operation information indicating which of cases the imaging apparatus uses the additional information received by the communication circuit. The cases include a case where the IRCF is inserted into the optical path, a case where the IRCF is retracted from the optical path, and both the cases where the IRCF is inserted and where the IRCF is retracted.

19 Claims, 23 Drawing Sheets

(51) Int. Cl.
    *H04N 5/235* (2006.01)
    *H04N 5/238* (2006.01)
    *H04N 5/33* (2006.01)
    *G03B 7/18* (2006.01)
    *G03B 11/00* (2006.01)
(52) U.S. Cl.
    CPC ........... *H04N 5/238* (2013.01); *H04N 5/2351* (2013.01); *H04N 5/23245* (2013.01); *H04N 5/33* (2013.01)

(56) References Cited

U.S. PATENT DOCUMENTS

| | | | |
|---|---|---|---|
| 8,817,107 B2* | 8/2014 | Matsumoto | G03B 7/18 348/164 |
| 9,083,928 B2* | 7/2015 | Maruyama | H04N 5/243 |
| 9,091,903 B2* | 7/2015 | Bunker | G03B 11/00 |
| 2005/0141117 A1* | 6/2005 | Kim | H04N 5/2254 359/892 |
| 2007/0257995 A1* | 11/2007 | Horowitz | G01J 1/4228 348/234 |
| 2011/0193967 A1* | 8/2011 | Matsumoto | G03B 7/18 348/164 |
| 2012/0013765 A1* | 1/2012 | Maruyama | H04N 5/243 348/223.1 |
| 2012/0026325 A1* | 2/2012 | Bunker | G03B 11/00 348/143 |
| 2015/0358527 A1* | 12/2015 | Niida | G03B 11/00 348/211.3 |

FOREIGN PATENT DOCUMENTS

| | | |
|---|---|---|
| JP | 2012-23606 A | 2/2012 |
| JP | 2012-065273 A | 3/2012 |
| TW | 201143385 A | 12/2011 |

* cited by examiner

FIG.2A

```
<xs:complexType name="ImagingSettings20">
    <xs:sequence>
        <xs:element name="Brightness" type="tt:FloatRange" minOccurs="0"/>
        <xs:element name="Contrast" type="tt:FloatRange" minOccurs="0"/>
        <xs:element name="IrCutFilterModes" type="tt:IrCutFilterMode" minOccurs="0" maxOccurs="unbounded"/>
        <xs:element name="Sharpness" type="tt:FloatRange" minOccurs="0"/>
        <xs:element name="WhiteBalance" type="tt:WhiteBalanceOptions20" minOccurs="0"/>
        .....
    </xs:sequence>
    <xs:anyAttribute processContents="lax"/>
</xs:complexType>
```

FIG.2B

```
<xs:simpleType name="IrCutFilterMode">
    <xs:restriction base="xs:string">
        <xs:enumeration value="ON"/>
        <xs:enumeration value="OFF"/>
        <xs:enumeration value="AUTO"/>
    </xs:restriction>
</xs:simpleType>
```

FIG.2C

```
<xs:element name="IrCutFilterAutoAdjustment" type="tt:IrCutFilterAutoAdjustment" minOccurs="0" maxOccurs="2" />
```

FIG.2D

```
<xs:complexType name="IrCutFilterAutoAdjustment">
    <xs:sequence>
        <xs:element name="BoundaryType" type="tt:IrCutFilterAutoBoundaryType" />
        <xs:element name="BoundaryOffset" type="xs:float" minOccurs="0" />
        <xs:element name="ResponseTime" type="xs:duration" minOccurs="0" />
    </xs:sequence>
</xs:complexType>
```

FIG.2E

```
<xs:simpleType name=" IrCutFilterAutoBoundaryType">
    <xs:restriction base="xs:string">
        <xs:enumeration value="Common"/>
        <xs:enumeration value="ToOn"/>
        <xs:enumeration value="ToOff"/>
        <xs:enumeration value="Extended"/>
    </xs:restriction>
</xs:simpleType>
```

FIG.3A

```
<s:Body
 xmlns:xsi="http://www.w3.org/2001/XMLSchema-instance"
 xmlns:xsd="http://www.w3.org/2001/XMLSchema">
        <SetImagingSettings xmlns="http://www.onvif.org/ver20/imaging/wsdl">
                <VideoSourceToken>0</VideoSourceToken>
                <ImagingSettings>
                        <IrCutFilter xmlns="http://www.onvif.org/ver10/schema">
                        AUTO
                        </IrCutFilter>
                        <IrCutFilterAutoAdjustment>
                                <BoundaryType>ToOff</BoundaryType>
                                <BoundaryOffset>-0.52</BoundaryOffset>
                                <ResponseTime>PT1M30S</ResponseTime>
                        </IrCutFilterAutoAdjustment>
                </ImagingSettings>
                <ForcePersistence>false</ForcePersistence>
        </SetImagingSettings>
</s:Body>
```

FIG.3B

```
<s:Body
 xmlns:xsi="http://www.w3.org/2001/XMLSchema-instance"
 xmlns:xsd="http://www.w3.org/2001/XMLSchema">
        <SetImagingSettings xmlns="http://www.onvif.org/ver20/imaging/wsdl">
                <VideoSourceToken>0</VideoSourceToken>
                <ImagingSettings>
                        <IrCutFilter xmlns="http://www.onvif.org/ver10/schema">
                        AUTO
                        </IrCutFilter>
                        <IrCutFilterAutoAdjustment>
                                <BoundaryType>ToOn</BoundaryType>
                                <BoundaryOffset>0.65</BoundaryOffset>
                                <ResponseTime>PT1M10S</ReponseTime>
                        </IrCutFilterAutoAdjustment>
                </ImagingSettings>
                <ForcePersistence>false</ForcePersistence>
        </SetImagingSettings>
</s:Body>
```

FIG.3C

```
<s:Body
 xmlns:xsi="http://www.w3.org/2001/XMLSchema-instance"
 xmlns:xsd="http://www.w3.org/2001/XMLSchema">
        <SetImagingSettings xmlns="http://www.onvif.org/ver20/imaging/wsdl">
                <VideoSourceToken>0</VideoSourceToken>
                <ImagingSettings>
                        <IrCutFilter xmlns="http://www.onvif.org/ver10/schema">
                        AUTO
                        </IrCutFilter>
                        <IrCutFilterAutoAdjustment>
                                <BoundaryType>Common</BoundaryType>
                                <BoundaryOffset>0.52</BoundaryOffset>
                                <ResponseTime>PT1M15S</ResponseTime>
                        </IrCutFilterAutoAdjustment>
                </ImagingSettings>
                <ForcePersistence>false</ForcePersistence>
        </SetImagingSettings>
</s:Body>
```

FIG.4A

```
<s:Body
 xmlns:xsi="http://www.w3.org/2001/XMLSchema-instance"
 xmlns:xsd="http://www.w3.org/2001/XMLSchema">
        <SetImagingSettings xmlns="http://www.onvif.org/ver20/imaging/wsdl">
                <VideoSourceToken>0</VideoSourceToken>
                <ImagingSettings>
                        <IrCutFilter xmlns="http://www.onvif.org/ver10/schema">
                        AUTO
                        </IrCutFilter>
                </ImagingSettings>
                <ForcePersistence>false</ForcePersistence>
        </SetImagingSettings>
</s:Body>
```

FIG.4B

```
<s:Body
 xmlns:xsi="http://www.w3.org/2001/XMLSchema-instance"
 xmlns:xsd="http://www.w3.org/2001/XMLSchema">
        <SetImagingSettings xmlns="http://www.onvif.org/ver20/imaging/wsdl">
                <VideoSourceToken>0</VideoSourceToken>
                <ImagingSettings>
                        <IrCutFilter xmlns="http://www.onvif.org/ver10/schema">
                        ON
                        </IrCutFilter>
                </ImagingSettings>
                <ForcePersistence>false</ForcePersistence>
        </SetImagingSettings>
</s:Body>
```

FIG.4C

```
<s:Body
 xmlns:xsi="http://www.w3.org/2001/XMLSchema-instance"
 xmlns:xsd="http://www.w3.org/2001/XMLSchema">
        <SetImagingSettings xmlns="http://www.onvif.org/ver20/imaging/wsdl">
                <VideoSourceToken>0</VideoSourceToken>
                <ImagingSettings>
                        <IrCutFilter xmlns="http://www.onvif.org/ver10/schema">
                        OFF
                        </IrCutFilter>
                </ImagingSettings>
                <ForcePersistence>false</ForcePersistence>
        </SetImagingSettings>
</s:Body>
```

FIG.5A

```
<s:Body
 xmlns:xsi="http://www.w3.org/2001/XMLSchema-instance"
 xmlns:xsd="http://www.w3.org/2001/XMLSchema">
        <SetImagingSettings xmlns="http://www.onvif.org/ver20/imaging/wsdl">
                <VideoSourceToken>0</VideoSourceToken>
                <ImagingSettings>
                        <IrCutFilter xmlns="http://www.onvif.org/ver10/schema">
                        AUTO
                        </IrCutFilter>
                        <IrCutFilterAutoAdjustment>
                                <BoundaryType>Common</BoundaryType>
                                <BoundaryOffset>0.88</BoundaryOffset>
                                <ResponseTime>PT15S</ResponseTime>
                        </IrCutFilterAutoAdjustment>
                        <IrCutFilterAutoAdjustment>
                                <BoundaryType>ToOn</BoundaryType>
                                <BoundaryOffset>0.16</BoundaryOffset>
                                <ResponseTime>PT1M30S</ResponseTime>
                        </IrCutFilterAutoAdjustment>
                        <IrCutFilterAutoAdjustment>
                                <BoundaryType>ToOff</BoundaryType>
                                <BoundaryOffset>-0.62</BoundaryOffset>
                                <ResponseTime>PT1M10S</ResponseTime>
                        </IrCutFilterAutoAdjustment>
                </ImagingSettings>
                <ForcePersistence>false</ForcePersistence>
        </SetImagingSettings>
</s:Body>
```

FIG.5B

```
<s:Body
 xmlns:xsi="http://www.w3.org/2001/XMLSchema-instance"
 xmlns:xsd="http://www.w3.org/2001/XMLSchema">
        <SetImagingSettings xmlns="http://www.onvif.org/ver20/imaging/wsdl">
                <VideoSourceToken>0</VideoSourceToken>
                <ImagingSettings>
                        <IrCutFilter xmlns="http://www.onvif.org/ver10/schema">
                        AUTO
                        </IrCutFilter>
                        <IrCutFilterAutoAdjustment>
                                <BoundaryType>ToOn</BoundaryType>
                                <BoundaryOffset>0.16</BoundaryOffset>
                                <ResponseTime>PT1M30S</ResponseTime>
                        </IrCutFilterAutoAdjustment>
                        <IrCutFilterAutoAdjustment>
                                <BoundaryType>ToOff</BoundaryType>
                                <BoundaryOffset>-0.62</BoundaryOffset>
                                <ResponseTime>PT1M10S</ResponseTime>
                        </IrCutFilterAutoAdjustment>
                </ImagingSettings>
                <ForcePersistence>false</ForcePersistence>
        </SetImagingSettings>
</s:Body>
```

FIG.10A

```
<s:Body
 xmlns:xsi="http://www.w3.org/2001/XMLSchema-instance"
 xmlns:xsd="http://www.w3.org/2001/XMLSchema">
        <GetOptions xmlns="http://www.onvif.org/ver20/imaging/wsdl">
                <VideoSourceToken>0</VideoSourceToken>
        </GetOptions>
</s:Body>
```

FIG.10B

```
<s:Body
 xmlns:xsi="http://www.w3.org/2001/XMLSchema-instance"
 xmlns:xsd="http://www.w3.org/2001/XMLSchema"
 xmlns:img20="http://www.onvif.org/ver20/schema">
        <GetOptionsResponse xmlns="http://www.onvif.org/ver20/imaging/wsdl">
                <ImagingOptions20>
                ......
                        <img20:IrCutFilterModes>ON</img20:IrCutFilterModes>
                        <img20:IrCutFilterModes>OFF</img20:IrCutFilterModes>
                        <img20:IrCutFilterModes>AUTO</img20:IrCutFilterModes>
                ......
                </ImagingOptions20>
                <ImagingOptions20Extension>
                ......
                <ImagingOptions20Extension2>
                        <IrCutFilterAutoAdjustmentOptions>
                                <img20:Mode>Common</img20:Mode>
                                <img20:Mode>ToOn</img20:Mode>
                                <img20:Mode>ToOff</img20:Mode>
                                <img20:BoundaryOffset>true</img20:BoundaryOffset>
                                <img20:ResponseTime>
                                        <img20:Min>PT0S</img20:Min>
                                        <img20:Max>PT30M<img20:Max>
                                </img20ResponseTime>
                        </IrCutFilterAutoAdjustmentOptions>
                </ImagingOptions20Extension>
                ......
                </ImagingOptions20Extension2>
        </GetOptionsResponse>
</s:Body>
```

FIG.11

```
<s:Body
 xmlns:xsi="http://www.w3.org/2001/XMLSchema-instance"
 xmlns:xsd="http://www.w3.org/2001/XMLSchema"
 xmlns:img20="http://www.onvif.org/ver20/schema">
            <GetOptionsResponse xmlns="http://www.onvif.org/ver20/imaging/wsdl">
                        <ImagingOptions20>
                                    . . . . . .
                                            <img20:IrCutFilterModes>ON</img20:IrCutFilterModes>
                                            <img20:IrCutFilterModes>OFF</img20:IrCutFilterModes>
                                            <img20:IrCutFilterModes>AUTO</img20:IrCutFilterModes>
                                    . . . . . .
                        </ImagingOptions20>
                        <ImagingOptions20Extension>
                        . . . . . .
                        <ImagingOptions20Extension2>
                                    <IrCutFilterAutoAdjustmentOptions>
                                            <img20:Mode>Common</img20:Mode>
                                            <img20:BoundaryOffset>true</img20:BoundaryOffset>
                                            <img20:ResponseTime>
                                                        <img20:Min>PT0S</img20:Min>
                                                        <img20:Max>PT30M<img20:Max>
                                            </img20ResponseTime>
                                    </IrCutFilterAutoAdjustmentOptions>
                                    <IrCutFilterAutoAdjustmentOptions>
                                            <img20:Mode>ToOn</img20:Mode>
                                            <img20:BoundaryOffset>true</img20:BoundaryOffset>
                                            <img20:ResponseTime>
                                                        <img20:Min>PT0S</img20:Min>
                                                        <img20:Max>PT30M<img20:Max>
                                            </img20ResponseTime>
                                    </IrCutFilterAutoAdjustmentOptions>
                                    <IrCutFilterAutoAdjustmentOptions>
                                            <img20:Mode>ToOff</img20:Mode>
                                            <img20:BoundaryOffset>true</img20:BoundaryOffset>
                                            <img20:ResponseTime>
                                                        <img20:Min>PT0S</img20:Min>
                                                        <img20:Max>PT30M<img20:Max>
                                            </img20ResponseTime>
                                    </IrCutFilterAutoAdjustmentOptions>
                        </ImagingOptions20Extension>
                        . . . . . .
                        </ImagingOptions20Extension2>
            </GetOptionsResponse>
</s:Body>
```

FIG.12A

```
<s:Body
 xmlns:xsi="http://www.w3.org/2001/XMLSchema-instance"
 xmlns:xsd="http://www.w3.org/2001/XMLSchema">
 xmlns:img20="http://www.onvif.org/ver20/schema">
        <GetOptionsResponse xmlns="http://www.onvif.org/ver20/imaging/wsdl">
                <ImagingOptions20>
                    ......
                        <img20:IrCutFilterModes>ON</img20:IrCutFilterModes>
                        <img20:IrCutFilterModes>OFF</img20:IrCutFilterModes>
                        <img20:IrCutFilterModes>AUTO</img20:IrCutFilterModes>
                    ......
                </ImagingOptions20>
                <ImagingOptions20Extension>
                    ......
                    <ImagingOptions20Extension2>
                        <IrCutFilterAutoAdjustmentOptions>
                            <img20:Modes>Common</img20:Mode>
                            <img20:BoundaryOffset>true</img20:BoundaryOffset>
                            <img20:ResponseTime>
                                <img20:Min>PT0S</img20:Min>
                                <img20:Max>PT30M<img20:Max>
                            </img20ResponseTime>
                        </IrCutFilterAutoAdjustment>
                    </ImagingOptions20Extension>
                    ......
                    </ImagingOptions20Extension2>
        </GetOptionsResponse>
</s:Body>
```

FIG.12B

```
<s:Body
 xmlns:xsi="http://www.w3.org/2001/XMLSchema-instance"
 xmlns:xsd="http://www.w3.org/2001/XMLSchema">
 xmlns:img20="http://www.onvif.org/ver20/schema">
        <GetOptionsResponse xmlns="http://www.onvif.org/ver20/imaging/wsdl">
                <ImagingOptions20>
                    ......
                        <img20:IrCutFilterModes>ON</img20:IrCutFilterModes>
                        <img20:IrCutFilterModes>OFF</img20:IrCutFilterModes>
                        <img20:IrCutFilterModes>AUTO</img20:IrCutFilterModes>
                    ......
                </ImagingOptions20>
                <ImagingOptions20Extension>
                    ......
                    <ImagingOptions20Extension2>
                        <IrCutFilterAutoAdjustmentOptions>
                            <img20:Modes>ToOn</img20:Mode>
                            <img20:Modes>ToOff</img20:Mode>
                            <img20:BoundaryOffset>true</img20:BoundaryOffset>
                            <img20:ResponseTime>
                                <img20:Min>PT0S</img20:Min>
                                <img20:Max>PT30M<img20:Max>
                            </img20:ResponseTime>
                        </IrCutFilterAutoAdjustment>
                    </ImagingOptions20Extension>
                    ......
                    </ImagingOptions20Extension2>
        </GetOptionsResponse>
</s:Body>
```

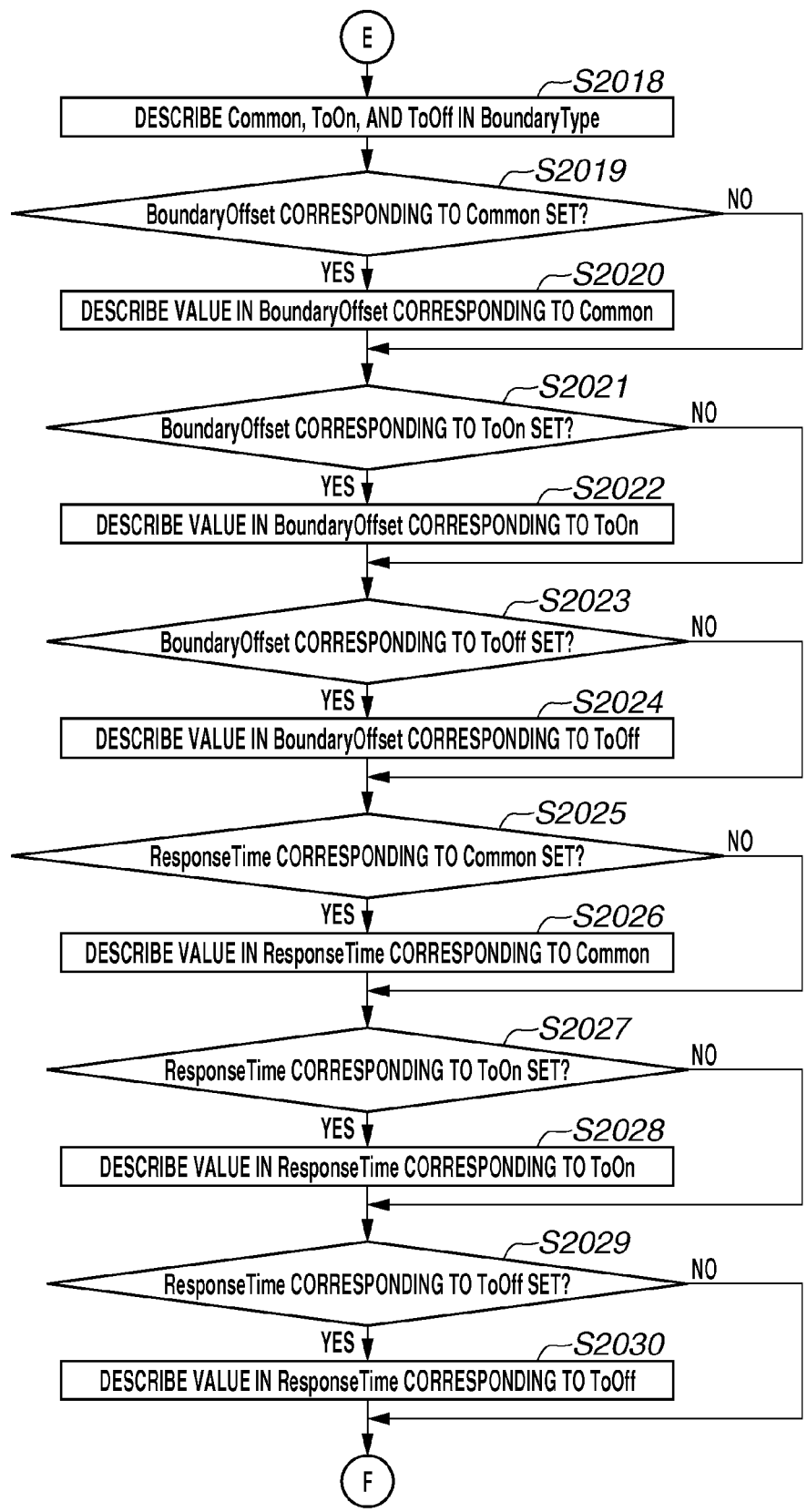

IMAGING APPARATUS, CLIENT APPARATUS, IMAGING SYSTEM, METHOD FOR CONTROLLING IMAGING APPARATUS, METHOD FOR CONTROLLING CLIENT APPARATUS, AND METHOD FOR CONTROLLING IMAGING SYSTEM FOR CONTROLLING SENSITIVITY USING THE INSERTION AND RETRACTION OF AN INFRARED CUT FILTER INTO AND FROM AN OPTICAL PATH

TECHNICAL FIELD

The present invention relates to an imaging apparatus, a client apparatus, an imaging system, a method for controlling the imaging apparatus, a method for controlling the client apparatus, and a method for controlling the imaging system. In particular, the present invention is adapted to the technique to insert and retract an infrared cut filter into and from an optical path of an imaging optical system.

BACKGROUND ART

Some conventional imaging apparatuses are capable of performing visible light shooting and infrared shooting with an infrared cut filter inserted into and retracted from an optical path of an imaging optical system, and are also capable of performing low-illuminance shooting with gains for color signals, used for white balance adjustment, raised (PTL 1).

The above-mentioned imaging apparatuses are generally configured to perform shooting under visible light when the infrared cut filter is inserted into the optical path of the imaging optical system and to perform shooting under infrared light when the infrared cut filter is retracted from the optical path of the imaging optical system. Also, the above-mentioned imaging apparatuses are capable of reducing the number of times of insertion and retraction of the infrared cut filter by increasing sensitivity with gains for color signals, used for white balance adjustment, raised.

Furthermore, the above-mentioned imaging apparatuses are capable of decreasing undesirable images being captured due to the movement of an infrared cut filter, by reducing the untimely insertion and retraction of the infrared cut filter.

CITATION LIST

Patent Literature

[PTL 1] Japanese Patent Application Laid-Open No. 2012-23606

SUMMARY OF INVENTION

Technical Problem

However, in the above-mentioned conventional imaging apparatuses, when the gains for color signals are excessively raised, noise becomes conspicuous in the captured image.

The above disturbance, such as noise, differs with captured images in the manner of conspicuity or the frequency of appearance. Therefore, it is impossible to uniformly control the gains of image signals based on a fixed luminance value previously set for the imaging apparatus.

To deal with these issues, it is possible to conceive an imaging apparatus configured to retract the infrared cut filter from the optical path of the imaging optical system before the disturbance becomes conspicuous on the image plane and then to perform infrared shooting. However, even such an imaging apparatus cannot perform, at appropriate timing, high-sensitivity shooting, such as high-gain shooting, and infrared shooting with the infrared cut filter retracted.

In view of above-described issues, the present invention is directed to an imaging apparatus capable of performing, at appropriate timing, high-sensitivity shooting, such as high-gain shooting, and infrared shooting with the infrared cut filter retracted.

Solution to Problem

According to one of the aspects of the present invention, an imaging apparatus that communicates with an external apparatus via a network includes an imaging optical system, an infrared cut filter that cuts off infrared light, an insertion and retraction unit configured to insert and retract the infrared cut filter into and from an optical path of the imaging optical system, an image sensor configured to capture an image of an object formed by the imaging optical system, a sensitivity increasing unit configured to increase gain of a video signal output from the image sensor by use of a means other than retracting the infrared cut filter from the optical path of the imaging optical system, a reception unit configured to receive, from the external apparatus via the network, an adjustment command in which adjustment information about insertion and retraction of the infrared cut filter is described, the adjustment information being describable separately for a case where the infrared cut filter is inserted into the optical path and a case where the infrared cut filter is retracted from the optical path, and a control unit configured to control the sensitivity increasing unit and the insertion and retraction unit at respectively different timing based on the adjustment command received by the reception unit.

Further features of the present invention will become apparent from the following description of exemplary embodiments with reference to the attached drawings.

BRIEF DESCRIPTION OF DRAWINGS

FIG. 2A illustrates a data structure for use in a command received by the imaging apparatus according to the first exemplary embodiment of the present invention.

FIG. 2B illustrates a data structure for use in the command received by the imaging apparatus according to the first exemplary embodiment of the present invention.

FIG. 2C illustrates a data structure for use in the command received by the imaging apparatus according to the first exemplary embodiment of the present invention.

FIG. 2D illustrates a data structure for use in the command received by the imaging apparatus according to the first exemplary embodiment of the present invention.

FIG. 2E illustrates a data structure for use in the command received by the imaging apparatus according to the first exemplary embodiment of the present invention.

FIG. 3A illustrates a configuration example of a command received by the imaging apparatus according to the first exemplary embodiment of the present invention.

FIG. 3B illustrates a configuration example of the command received by the imaging apparatus according to the first exemplary embodiment of the present invention.

FIG. 3C illustrates a configuration example of the command received by the imaging apparatus according to the first exemplary embodiment of the present invention.

FIG. 4A illustrates a configuration example of a command received by the imaging apparatus according to the first exemplary embodiment of the present invention.

FIG. 4B illustrates a configuration example of the command received by the imaging apparatus according to the first exemplary embodiment of the present invention.

FIG. 4C illustrates a configuration example of the command received by the imaging apparatus according to the first exemplary embodiment of the present invention.

FIG. 5A illustrates a configuration example of a command received by the imaging apparatus according to the first exemplary embodiment of the present invention.

FIG. 5B illustrates a configuration example of the command received by the imaging apparatus according to the first exemplary embodiment of the present invention.

FIG. 10A illustrates a configuration example of a command received by the imaging apparatus according to the first exemplary embodiment of the present invention.

FIG. 10B illustrates a configuration example of a command transmitted by the imaging apparatus according to the first exemplary embodiment of the present invention.

FIG. 11 illustrates configuration examples of a command received by the imaging apparatus and a response transmitted by the imaging apparatus according to the first exemplary embodiment of the present invention.

FIG. 12A illustrates a configuration example of a response transmitted by the imaging apparatus according to the first exemplary embodiment of the present invention.

FIG. 12B illustrates a configuration example of a response transmitted by the imaging apparatus according to the first exemplary embodiment of the present invention.

FIG. 22 is a flowchart illustrating a part of the SetImagingSettings command issuance process performed by the external client according to the first exemplary embodiment of the present invention.

DESCRIPTION OF EMBODIMENTS

First Exemplary Embodiment

Various exemplary embodiments, features, and aspects of the invention will be described in detail below with reference to the drawings. An imaging apparatus according to an exemplary embodiment of the present invention is a monitoring camera that captures a moving image, and is more particularly a network camera used for monitoring.

Figure 1:
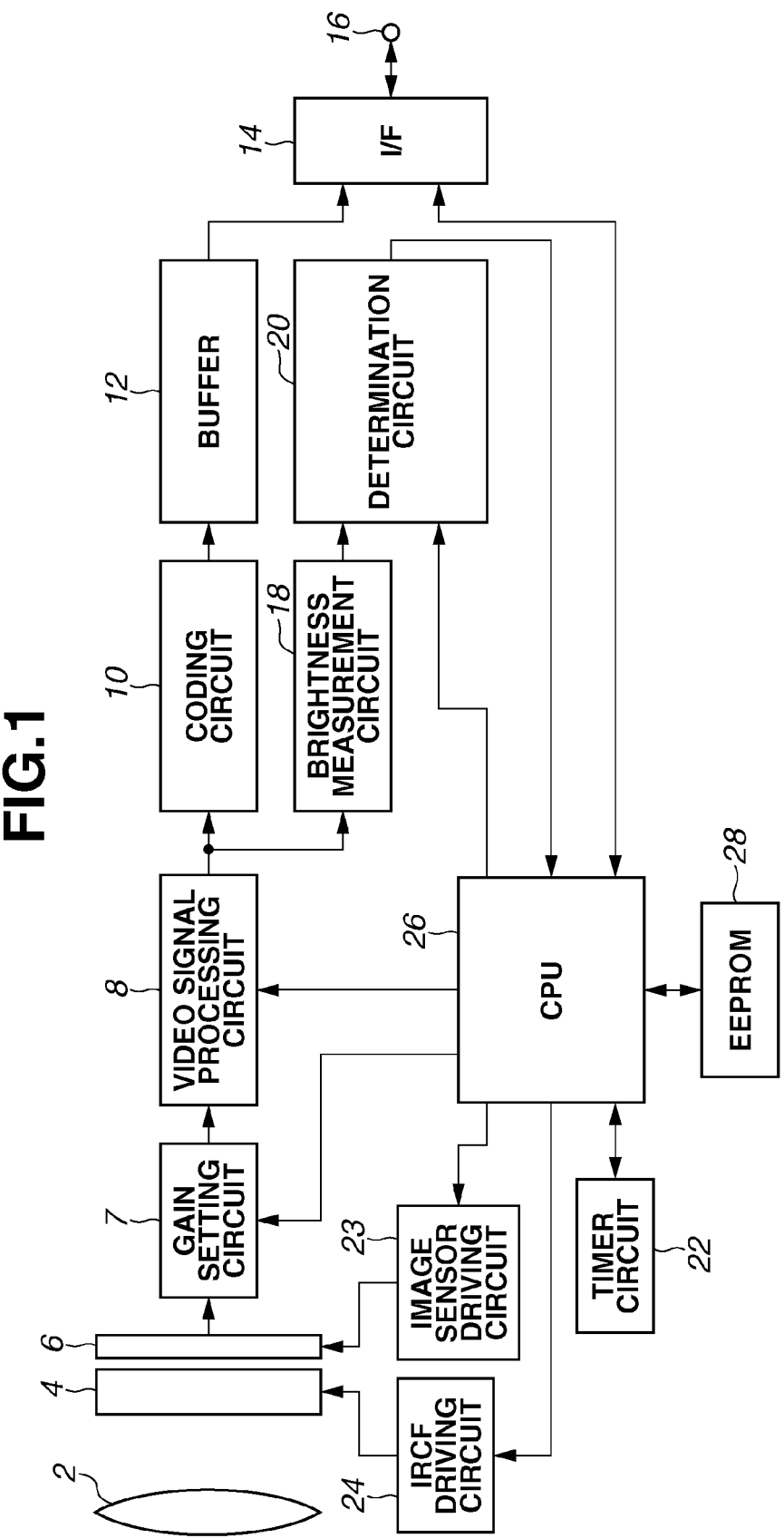
FIG. 1 is a block diagram illustrating a configuration of an imaging apparatus according to a first exemplary embodiment of the present invention.

FIG. 1 is a block diagram illustrating a configuration of an imaging apparatus according to a first exemplary embodiment of the present invention. Referring to FIG. 1, the imaging apparatus according to the present exemplary embodiment includes an imaging optical system 2, an infrared cut filter (hereinafter also referred to as an IRCF) 4, an image sensor 6, a gain setting circuit 7, a video signal processing circuit 8, a coding circuit 10, and a buffer 12.

Referring also to FIG. 1, the imaging apparatus further includes a communication circuit (hereinafter also referred to as an I/F) 14, a communication terminal 16, a brightness measurement circuit 18, a determination circuit 20, and a timer circuit 22. The imaging apparatus further includes an image sensor driving circuit 23 and an infrared cut filter driving circuit (hereinafter also referred to as an IRCF driving circuit) 24.

Referring also to FIG. 1, the imaging apparatus further includes a central processing unit (hereinafter also referred to as a CPU) 26 and an electrically erasable programmable read only memory (hereinafter also referred to as an EEPROM) 28.

An operation of the imaging apparatus is described below with reference to FIG. 1. The image sensor 6 receives light rays from an object to be shot via the imaging optical system 2 and the IRCF 4, and photoelectrically converts the light rays into a video signal. The IRCF 4, which cuts off (blocks) infrared light, is configured to be inserted into and retracted from an optical path between the imaging optical system 2 and the image sensor 6 by a driving mechanism (not illustrated) based on a driving signal from the IRCF driving circuit 24.

The IRCF driving circuit 24 and the driving mechanism (not illustrated) according to the present exemplary embodiment correspond to an insertion and retraction unit configured to insert and retract the IRCF 4 into and from the optical path of the imaging optical system 2.

The imaging apparatus according to the present exemplary embodiment is configured to perform normal shooting (visible light shooting) when the IRCF 4 is inserted into the optical path, to perform high-sensitivity shooting when the image brightness for shooting is low, and to perform infrared shooting when the IRCF 4 is retracted from the optical path. The normal shooting according to the present exemplary embodiment is equivalent to a shooting operation performed at normal sensitivity.

The image sensor 6 according to the present exemplary embodiment is composed of a charge-coupled device (CCD) sensor or a complementary metal-oxide semiconductor (CMOS) sensor. Also, the image sensor 6 according to the present exemplary embodiment corresponds to an imaging unit configured to capture an image of an object formed by the imaging optical system 2 to output a video signal.

Furthermore, the normal shooting (visible light shooting) according to the present exemplary embodiment means a shooting operation performed with light from an object made incident on the image sensor 6 via the IRCF 4. The infrared shooting according to the present exemplary embodiment means a shooting operation performed with light from an object made incident on the image sensor 6 without involving the IRCF 4.

The high-sensitivity shooting according to the present exemplary embodiment means a shooting operation performed, for example, with the gains for color signals used for white balance raised by the gain setting circuit 7. Hereinafter, the high-sensitivity shooting operation may be referred to as high-color-signal-gain shooting.

When infrared shooting or high-sensitivity shooting, in which the color balance of an output video signal is disrupted, is performed, the CPU 26 converts a video signal input to the video signal processing circuit 8 or the coding circuit 10 into a monochrome video signal and transmits the monochrome video signal via the I/F 14. The shooting mode of the imaging apparatus performed in such a case is referred to as a monochrome mode.

The present exemplary embodiment employs the above-described high-color-signal-gain shooting as high-sensitivity shooting. However, the present exemplary embodiment may employ, as high-sensitivity shooting, another configuration or a combination of the high-color-signal-gain shooting and another configuration. The mode of the imaging apparatus performed during high-color-signal-gain shooting corresponds to a high-color-signal-gain shooting mode.

For example, the high-sensitivity shooting can be performed by lengthening the accumulation time for photoelectric conversion at the image sensor 6 (photoelectric accumulation time) according to an operation of the image sensor driving circuit 23. Such a shooting operation can be referred to as slow-shutter shooting or low-shutter-speed shooting. In the present exemplary embodiment, the mode of the imaging apparatus performed during low-shutter-speed shooting corresponds to an accumulation time control shooting mode.

Furthermore, the high-sensitivity shooting can be performed by adding up signals from the same pixel over a plurality of frames using a pixel memory (not illustrated in FIG. 1) and an addition circuit (not illustrated in FIG. 1) included in the video signal processing circuit 8. Such an operation may be referred to as plural-frame-addition shooting. In the present exemplary embodiment, the mode of the imaging apparatus performed during plural-frame-addition shooting corresponds to a plural-frame-addition shooting mode.

As described above, the imaging apparatus according to the present exemplary embodiment can also perform high-sensitivity shooting by combining any two shooting methods of the above-described high-color-signal-gain shooting, slow shutter shooting, and plural-frame-addition shooting. In addition, the imaging apparatus according to the present exemplary embodiment can also perform high-sensitivity shooting by combining all of the above-described high-color-signal-gain shooting, slow shutter shooting, and plural-frame-addition shooting.

When normal shooting is performed, with the emphasis on the color reproducibility of a video signal output from the image sensor 6, the CPU 26 converts a video signal output from the image sensor 6 into a color video signal and transmits the color video signal via the I/F 14. The shooting mode of the imaging apparatus performed in such a case is referred to as a color mode.

In the present exemplary embodiment, when infrared shooting is performed, the CPU 26 instructs the video signal processing circuit 8 to output only a luminance signal to the coding circuit 10. The coding circuit 10 outputs the coded luminance signal to the buffer 12. The I/F 14 receives the coded luminance signal from the buffer 12 and transforms the receive signal into packets, which are transmitted to an external client (not illustrated in FIG. 1) via the communication terminal 16.

On the other hand, when normal shooting is performed, the CPU 26 instructs the video signal processing circuit 8 to output a luminance signal and color-difference signals to the coding circuit 10. Then, the coded video signal output from the coding circuit 10 is similarly transmitted to the external client via the buffer 12, the I/F 14, and the communication terminal 16.

The communication terminal 16 according to the present exemplary embodiment is composed of a terminal connectable to a local area network (LAN) cable (a LAN terminal).

The I/F 14 can receive, from the external client, a setting command about insertion and retraction of the IRCF 4. The imaging apparatus and the external client according to the present exemplary embodiment constitute an imaging system.

When the external client has transmitted an insertion instruction command to insert the IRCF 4 into the optical path, the insertion instruction command is subjected to appropriate packet processing at the I/F 14 and is then input to the CPU 26. The CPU 26 interprets the insertion instruction command and then causes the IRCF driving circuit 24 to insert the IRCF 4 into the optical path.

The insertion instruction command is, for example, a SetImagingSettings command in which the value of an IrCutFilter field is set to On, which is described below.

Also, when the external client has transmitted a retraction instruction command to retract the IRCF 4 from the optical path, the retraction instruction command is subjected to appropriate packet processing at the I/F 14 and is then input to the CPU 26. The CPU 26 interprets the retraction instruction command and then causes the IRCF driving circuit 24 to retract the IRCF 4 from the optical path.

In the present exemplary embodiment, the external client (not illustrated) is configured to be able to transmit a command to make a setting that allows the imaging apparatus according to the present exemplary embodiment to determine retraction of the IRCF 4 from the optical path. That command is referred to, for example, as a command for Auto setting.

The command for Auto setting (Auto setting command) is, for example, a SetImagingSettings command in which the value of an IrCutFilter field is set to AUTO, which is described below.

In the present exemplary embodiment, the Auto setting command has such a configuration that an omissible operational parameter about insertion and retraction of the IRCF 4 can be added to an option field included in the Auto setting command.

The omissible operational parameter in the present exemplary embodiment is, for example, a brightness threshold used for the imaging apparatus according to the present exemplary embodiment to determine whether to insert the IRCF 4 into the optical path, perform the high-sensitivity shooting, or retract the IRCF 4 from the optical path according to a change in object brightness.

The option field included in the Auto setting command is, for example, an IrCutFilterAutoAdjustment field, which is described below. The brightness threshold (parameter) is, for example, the value of a BoundaryOffset field, which is described below.

If the above parameter is present in the option field included in the Auto setting command, the CPU 26 in FIG. 1 sets the corresponding threshold to the determination circuit 20. The brightness measurement circuit 18 measures the current object brightness based on a luminance signal output from the video signal processing circuit 8 and outputs a result of the measurement to the determination circuit 20. Thus, the brightness measurement circuit 18 according to the present exemplary embodiment corresponds to a light measurement unit configured to measure an object brightness.

The CPU 26 according to the present exemplary embodiment may be configured, for example, to calculate a threshold by adding the brightness threshold parameter to threshold information previously stored in the EEPROM 28 and to set the calculated threshold to the determination circuit 20.

The EEPROM 28 according to the present exemplary embodiment may be configured, for example, to store a plurality of pieces of threshold information and brightness threshold parameters that are respectively associated with the plurality of pieces of threshold information. In addition, the CPU 26 according to the present exemplary embodiment may be configured, for example, to retrieve threshold information associated with a brightness threshold parameter from the EEPROM 28 and to set a threshold indicated by the retrieved threshold information to the determination circuit 20.

The determination circuit 20 compares the set brightness threshold with a current brightness value output from the brightness measurement circuit 18 and outputs a result of the comparison to the CPU 26. If the result of the comparison indicates that the current brightness value exceeds the brightness threshold, the CPU 26 performs control to insert the IRCF 4 into the optical path to enable normal shooting.

If the result of the comparison input to the CPU 26 indicates that the current brightness value is equal to or lower than the brightness threshold, the CPU 26 performs control to retract the IRCF 4 from the optical path to enable infrared shooting.

If the above omissible parameter of the object brightness threshold is not present in the option field included in the Auto setting command, the imaging apparatus according to the present exemplary embodiment determines the above threshold based on the pre-stored threshold information. In the present exemplary embodiment, the threshold is previously stored in, for example, the EEPROM 28, and the CPU 26 retrieves the threshold from the EEPROM 28 and sets the retrieved threshold to the determination circuit 20.

Thus, the CPU 26 according to the present exemplary embodiment functions as a brightness threshold parameter determination unit configured to determine whether a brightness threshold parameter is present in the option field included in the Auto setting command. More specifically, the CPU 26 functions as an Adjustment field determination unit configured to determine whether an IrCutFilterAutoAdjustment field, which is described below, is included in a SetImagingSettings command, which is described below.

In the present exemplary embodiment, data, such as threshold information, previously stored in the EEPROM 28 corresponds to control information. In addition, in the present exemplary embodiment, the threshold information previously stored in the EEPROM 28 corresponds to predetermined threshold information.

Furthermore, another omissible parameter in the above Auto setting command may be, for example, a delay time by which to delay the insertion or retraction operation of the IRCF 4. If that parameter is present in the option field included in the Auto setting command, the CPU 26 set the delay time parameter to the timer circuit 22. The delay time parameter is, for example, a ResponseTime field, which is described below.

The timer circuit 22 measures time and, when a set delay time has elapsed, outputs a signal indicating the elapse of the delay time to the CPU 26. The CPU 26, having received the time-elapsed signal, controls the IRCF driving circuit 24 to insert or retract the IRCF 4.

If the delay time parameter is not present in the option field included in the Auto setting command, the imaging apparatus according to the present exemplary embodiment determines the above parameter based on the pre-stored delay time information.

In the present exemplary embodiment, the delay time is previously stored in, for example, the EEPROM 28, and the CPU 26 retrieves the delay time from the EEPROM 28 and sets the retrieved delay time to the determination circuit 20. In addition, if the delay time parameter is not present in the option field included in the Auto setting command, the CPU 26 may perform control to immediately insert or retract the IRCF 4 without setting any delay time.

Thus, the CPU 26 according to the present exemplary embodiment functions as a delay time parameter determination unit configured to determine whether a delay time parameter is present in the option field included in the Auto setting command.

More specifically, the CPU 26 functions as a ResponseTime field determination unit configured to determine whether a ResponseTime field is included in an IrCutFilterAutoAdjustment field, which is described below.

In the present exemplary embodiment, the above command used to insert or retract the IRCF 4 into or from the optical path is defined based on, for example, the Open Network Video Interface Forum (hereinafter also referred to as ONVIF) standard. The ONVIF standard defines the above command using, for example, the XML Schema Definition language (hereinafter also referred to as XSD).

The imaging apparatus according to the present exemplary embodiment operates as a Network Video Transmitter (hereinafter also referred to as an NVT) defined in the ONVIF standard. In other words, the imaging apparatus according to the present exemplary embodiment can transmit and receive data according to the ONVIF standard.

FIGS. 2A to 2E illustrate examples of definition of the data structure for defining the above-described command using the XSD. Referring to FIG. 2A, data with the name "IrCutFilterModes" is defined within the data type "ImagingSettings20". The data with the name "IrCutFilterModes" is data having an IrCutFilterMode type, which is defined as illustrated in FIG. 2B.

As illustrated in FIG. 2B, in the present exemplary embodiment, the IrCutFilterMode type is a data type that can take the value of any one of ON, OFF, and AUTO.

FIG. 2C illustrates the definition of data with the name "IrCutFilterAutoAdjustment" of the IrCutFilterAutoAdjustment type.

In the present exemplary embodiment, the data with the name "IrCutFilterAutoAdjustment" is set in the option field when the IrCutFilterMode type has the value of AUTO. That data is defined within, for example, the above data type "ImagingSettings20".

FIG. 2D illustrates content of the above IrCutFilterAutoAdjustment type. The data type "IrCutFilterAutoAdjustment" is defined as a complex type according to the complexType declaration in the XSD. In this data type example, a sequence specifier is set to specify that the elements thereof appear in the order defined by the specifier.

In the IrCutFilterAutoAdjustment type, the first element "BoundaryType" is data having an IrCutFilterAutoBoundaryType type, which is described below. The data BoundaryType is defined such that at least one piece thereof is to appear within the IrCutFilterAutoAdjustment type.

The second element "BoundaryOffset" indicates data of the single-precision floating point data type, which is defined in the Primitive Datatype in the XSD. The data BoundaryOffset is the above-described brightness threshold parameter. The data BoundaryOffset may be specified to be omitted by a minOccurs specifier in the XSD.

In the present exemplary embodiment, the data BoundaryOffset is arranged to be set, for example, with a value within a predetermined range (for example, from 1.0 to −1.0) into which a range of brightness threshold values settable by the imaging apparatus according to the present exemplary embodiment is normalized.

In the present exemplary embodiment, the data BoundaryOffset is arranged to indicate the following brightness values. For example, the data BoundaryOffset having a value of 0 indicates a default value. The data BoundaryOffset having a value of −1.0 indicates a brightness value in the case of the darkest object. The data BoundaryOffset having a value of 1.0 indicates a brightness value in the case of the brightest object. The data BoundaryOffset according to the present exemplary embodiment corresponds to brightness information about brightness.

The third element "ResponseTime" indicates data of the duration time interval data type, which is defined in the Primitive Datatype in the XSD. The data ResponseTime is also arranged to be omissible by a minOccurs specifier in the XSD. The data ResponseTime specifies the above-described delay time parameter.

The data BoundaryOffset or ResponseTime in the present exemplary embodiment corresponds to additional information about insertion and retraction of the IRCF 4 into and from the optical path of the imaging optical system 2.

FIG. 2E illustrates an example of definition of the above IrCutFilterAutoBoundaryType type. The data type "IrCutFilterAutoBoundaryType" is defined as a simple type according to the simpleType declaration in the XSD. Furthermore, the data type "IrCutFilterAutoBoundaryType" is defined as a character string type with limited values according to a restriction specifier. Specifically, the data type "IrCutFilterAutoBoundaryType" is a character string type that can take the values of Common, ToOff, ToOn, and Extended, as illustrated in FIG. 2E.

As described above, the present exemplary embodiment has such an arrangement that an optional parameter can be added to the Auto setting command used to control insertion and retraction of the IRCF 4. The optional parameter can be selected from among the following options.

Option 1: Brightness threshold used to determine whether to retract the IRCF 4 when the object brightness has changed from a high brightness value to a low brightness value.

Option 2: Delay time from when the object brightness falls below the brightness threshold of Option 1 during a change of the object brightness from a high brightness value to a low brightness value until when the operation for retracting the IRCF 4 is actually completed.

Option 3: Brightness threshold used to determine whether to insert the IRCF 4 when the object brightness has changed from a low brightness value to a high brightness value.

Option 4: Delay time from when the object brightness exceeds the brightness threshold of Option 3 during a change of the object brightness from a low brightness value to a high brightness value until when the operation for inserting the IRCF 4 is actually completed.

In the present exemplary embodiment, according to the data definition using the above-described XSD, Option 1 to Option 4 in the Auto setting command can be expressed. In the ONVIF standard, the Auto setting command is issued, for example, as a SetImagingSettings command.

FIGS. 3A, 3B, and 3C and FIGS. 4A, 4B, and 4C illustrate configuration examples of the SetImagingSettings command. First, FIG. 3A illustrates a configuration of the SetImagingSettings command including the above option field. Referring to FIG. 3A, the value "AUTO" in the IrCutFilter field indicates that the imaging apparatus itself is allowed to automatically control insertion and retraction of the IRCF 4.

In the present exemplary embodiment, the SetImagingSettings command in which the value of the IrCutFilter field is set to AUTO corresponds to an automatic insertion and retraction control command that causes the imaging apparatus to automatically control insertion and retraction of the IRCF 4 via the IRCF driving circuit 24.

The present exemplary embodiment has such an arrangement that in a case where the value of the IrCutFilter field is set to AUTO, an IrCutFilterAutoAdjustment field can be described after the IrCutFilter field. As described above, the IrCutFilterAutoAdjustment field can be omitted.

As described above, the BoundaryType field, the BoundaryOffset field, and the ResponseTime field are described within the IrCutFilterAutoAdjustment field. Also, as described above, the BoundaryOffset field and the ResponseTime field can be omitted.

The BoundaryType field is used to specify in which of the cases of insertion and retraction of the IRCF 4 to enable an operation specified in the IrCutFilterAutoAdjustment field.

If the value of the BoundaryType field is ToOn, the specified operation is enabled when the IRCF 4 is inserted. If the value of the BoundaryType field is ToOff, the specified operation is enabled when the IRCF 4 is retracted.

In addition, if the value of the BoundaryType field is Common, the specified operation is enabled both when the IRCF 4 is inserted and when the IRCF 4 is retracted. Furthermore, as described above, the value of the BoundaryOffset field is used to set the brightness threshold, and the value of the ResponseTime field is used to set the delay time.

Thus, the BoundaryType field in the present exemplary embodiment corresponds to operation information indicating a case for which the imaging apparatus uses the BoundaryOffset field and the ResponseTime field received via the I/F 14.

The operation information indicates any one of a case where the IRCF 4 is inserted into the optical path of the imaging optical system 2, a case where the IRCF 4 is retracted from the optical path of the imaging optical system 2, and both the cases where the IRCF 4 is inserted and where the IRCF 4 is retracted.

FIG. 3B illustrates a configuration of the SetImagingSettings command in a case where the value of the BoundaryType field is ToOn.

In this case, when the IRCF 4 is inserted, the value of the BoundaryOffset field and the value of the ResponseTime field in the IrCutFilterAutoAdjustment field are enabled. Also, as described above, the brightness threshold is set with the value of the BoundaryOffset field, and the delay time is set with the value of the ResponseTime field.

FIG. 3C illustrates a configuration of the SetImagingSettings command in a case where the value of the BoundaryType field is Common. In this case, both when the IRCF 4 is inserted and when the IRCF 4 is retracted, the value of the BoundaryOffset field and the value of the ResponseTime field in the IrCutFilterAutoAdjustment field are enabled. Also, as described above, the brightness threshold is set with the value of the BoundaryOffset field, and the delay time is set with the value of the ResponseTime field.

FIG. 4A illustrates a configuration of the SetImagingSettings command in a case where the IrCutFilterAutoAdjustment field is omitted.

The imaging apparatus according to the present exemplary embodiment is configured to determine and perform, by itself, the entire control over the insertion and retraction of the IRCF 4 when receiving the following SetImagingSettings command, in which the IrCutFilterAutoAdjustment field is omitted to automatically set the insertion and retraction of the IRCF 4.

FIG. 4B illustrates a configuration of the SetImagingSettings command in a case where the value of the IrCutFilter field is ON. FIG. 4C illustrates a configuration of the SetImagingSettings command in a case where the value of the IrCutFilter field is OFF. In the present exemplary embodiment, in the cases illustrated in FIGS. 4B and 4C, the IrCutFilterAutoAdjustment field is not allowed to be set.

In a case where all of Common, ToOn, and ToOff are set in the respective BoundaryType fields within the IrCutFilterAutoAdjustment field, the imaging apparatus according to the present exemplary embodiment operates, for example, in the following manner.

For example, the parameter with the BoundaryType field set to Common is used as a switching parameter between normal shooting and high-sensitivity shooting. In the present exemplary embodiment, this parameter corresponds to third automatic adjustment information.

The parameter with the BoundaryType field set to ToOn is used as a switching parameter from infrared shooting to high-sensitivity shooting. In the present exemplary embodiment, this parameter corresponds to second automatic adjustment information.

The parameter with the BoundaryType field set to ToOff is used as a switching parameter from high-sensitivity shooting to infrared shooting. In the present exemplary embodiment, this parameter corresponds to first automatic adjustment information.

FIG. 5A illustrates a configuration example of the SetImagingSettings command described above.

FIG. 5B illustrates a configuration of the SetImagingSettings command in a case where a value corresponding to the IrCutFilter tag is AUTO.

The SetImagingSettings command includes a first IrCutFilterAutoAdjustment tag corresponding to the BoundaryType tag with the value set to ToOn. The SetImagingSettings command further includes a second IrCutFilterAutoAdjustment tag corresponding to the BoundaryType tag with the value set to ToOff.

Thus, the CPU 26 uses values corresponding respectively to the BoundaryType tag, the BoundaryOffset tag, and the ResponseTime tag in the first IrCutFilterAutoAdjustment tag to determine whether to insert the IRCF 4.

The CPU 26 further uses values corresponding respectively to the BoundaryType tag, the BoundaryOffset tag, and the ResponseTime tag in the second IrCutFilterAutoAdjustment tag to determine whether to retract the IRCF 4.

In addition, in the SetImagingSettings command, the BoundaryType tag associated with the value of ToOn and the BoundaryType tag associated with the value of ToOff can be described in this order.

In other words, the SetImagingSettings command can include the BoundaryType tag associated with the value of ToOn and the BoundaryType tag associated with the value of ToOff, which are described in this order.

Next, an operation performed when the brightness threshold and the delay time parameter have been set is described with reference to FIGS. 6A and 6B.

Figure 6A:
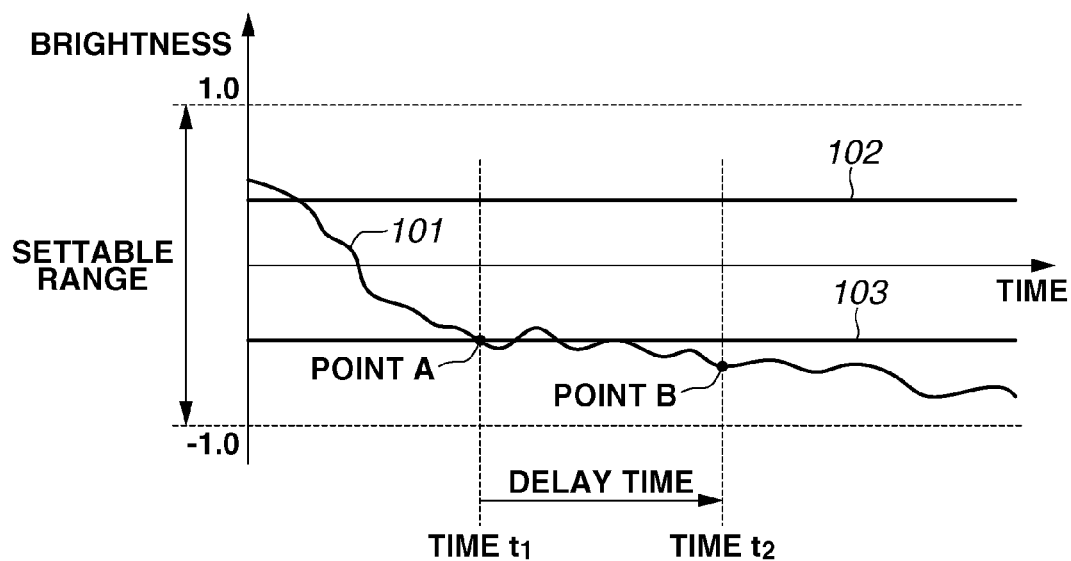
FIG. 6A is a temporal transition diagram of the brightness illustrating an operation example in the imaging apparatus according to the first exemplary embodiment of the present invention.

The graph of FIG. 6A illustrates a temporal change 101 of the object brightness, a brightness threshold 102 used to determine whether to insert the IRCF 4, and a brightness threshold 103 used to determine whether to retract the IRCF 4. FIG. 6A illustrates a case where the object brightness decreases with time at a time period such as dusk.

As described above, the brightness threshold is expressed with a value within a predetermined range, from −1.0 to 1.0, into which a range of brightness threshold values settable by the imaging apparatus according to the present exemplary embodiment is normalized. Thus, the brightness threshold has a value within the range from −1.0 to 1.0 as illustrated in FIGS. 6A and 6B.

Referring to FIG. 6A, when the object brightness decreases and falls below the brightness threshold 103, which is used to determine whether to retract the IRCF 4, the CPU 26 sets a delay time to the timer circuit 22 and starts time counting. In FIG. 6A, the object brightness falls below the brightness threshold 1003 at point A. The time of such an event is time $t_1$. In the present exemplary embodiment, according to the delay time set to the timer circuit 22, the CPU 26 does not retract the IRCF 4 until the delay time elapses.

Such an operation can prevent the frequent switching between normal shooting and infrared shooting even if the object brightness frequently changes across the brightness threshold 103 in two directions. Then, when the delay time has elapsed to reach the time $t_1$, the CPU 26 retracts the IRCF 4 to shift the imaging apparatus to infrared shooting.

The object brightness obtained after the delay time elapses has the probability of stably falling below the brightness threshold 103, for example, at point B in FIG. 6A. Such an operation is similarly effective even in a case where there is an adverse effect of a flicker due to illumination such as fluorescent light.

The above-described operation according to the present exemplary embodiment enables a user to configure the detailed settings about the insertion and retraction of the IRCF 4. Furthermore, the above-described operation according to the present exemplary embodiment provides an effect to prevent the IRCF 4 from being frequently inserted and retracted even in a case where the brightness level of an object to be shot is near the threshold.

In addition, the above-described operation according to the present exemplary embodiment provides an effect to prevent the IRCF 4 from being frequently inserted and retracted even in a case where the brightness value of an object to be shot varies due to a flicker of illumination or the like.

Next, an operation performed when the brightness threshold used to shift from normal shooting to high-sensitivity shooting has been set is described with reference to FIG. 6B. In FIG. 6B, the same reference numerals as those in FIG. 6A denote the same meanings and functions as those in FIG. 6A. FIG. 6B illustrates an operation of the imaging apparatus performed when the command illustrated in FIG. 5A is received.

Figure 6B:
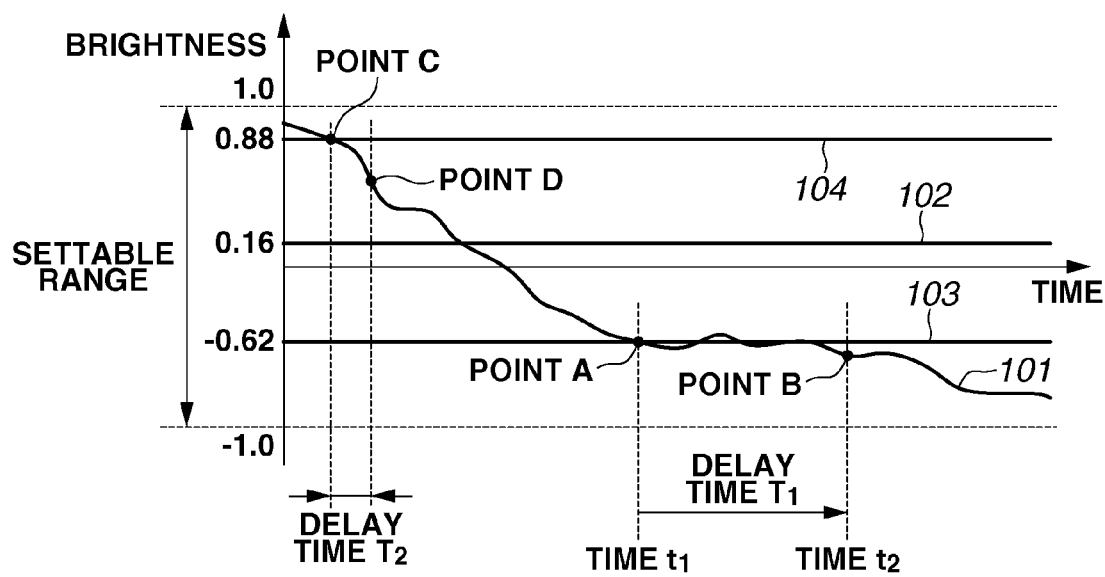
FIG. 6B is a temporal transition diagram of the brightness illustrating an operation example in the imaging apparatus according to the first exemplary embodiment of the present invention.

The graph of FIG. 6B additionally illustrates a brightness threshold 104 used to shift from normal shooting to high-sensitivity shooting or from high-sensitivity shooting to normal shooting. The value of the brightness threshold 104 is set with the BoundaryOffset field included in the IrCutFilterAutoAdjustment field in which BoundaryType field is set to Common, illustrated in FIG. 5A.

When the value of the BoundaryOffset field is 0.88 as illustrated in FIG. 5A, for example, the brightness threshold 104 is set to 0.88 as illustrated in FIG. 6B.

The graph of FIG. 6B also illustrates a temporal change 101 of the object brightness. When the object brightness indicated with the temporal change 101 transitions as illustrated in FIG. 6B and then falls below the brightness threshold 104 at point C, the CPU 26 sets a delay time $T_2$ to the timer circuit 22 and starts time counting, similarly to that described with reference to FIG. 6A.

The delay time $T_2$ that is set to the timer circuit 22 at point C is a time set with the ResponseTime field included in the IrCutFilterAutoAdjustment field in which BoundaryType field is set to Common, illustrated in FIG. 5A.

In the example illustrated in FIGS. 5A and 6B, the delay time $T_2$ is set to 15 seconds. Such an operation to set the delay time $T_2$ allows the imaging apparatus according to the present exemplary embodiment to shift from normal shooting to high-sensitivity shooting at point D.

As described above, usually, the brightness threshold is set via an external client with a value within a predetermined range, from −1.0 to 1.0, into which a range of brightness threshold values settable by the imaging apparatus according to the present exemplary embodiment is normalized.

However, a numerical value outside the predetermined range may be set as the brightness threshold due to a failure of the external client. To deal with such an issue, for example, if a numerical value outside the predetermined range is set, the imaging apparatus according to the present exemplary embodiment rounds the numerical value to the upper limit or lower limit of the predetermined range of settable values and sets the upper limit or lower limit as the brightness threshold.

More specifically, if a value smaller than −1.0, for example, −2.5, is received as the value of the BoundaryOffset field, the imaging apparatus according to the present exemplary embodiment uses −1.0 as the value of the BoundaryOffset field. If a value larger than 1.0, for example, 3.1, is received as the value of the BoundaryOffset field, the imaging apparatus according to the present exemplary embodiment uses 1.0 as the value of the BoundaryOffset field.

In the above-described exemplary embodiment, any set value outside a range of settable values is rounded to the upper limit or lower limit of the range of settable values to be used as the value of the BoundaryOffset field. However, this is not a restrictive one.

For example, the imaging apparatus may send an error message in response to the SetImagingSettings command received from the external client. In this case, the imaging apparatus according to the present exemplary embodiment transmits the SetImagingSettingsResponse in which a response code indicating that the value of the BoundaryOffset field is incorrect is described.

Thus, in the present exemplary embodiment, the SetImagingSettingsResponse in which a response code indicating that the value of the BoundaryOffset field is incorrect corresponds to error information. The error information is a response to the SetImagingSettings command in which the value of the IrCutFilter field is set to Auto.

Figure 7:
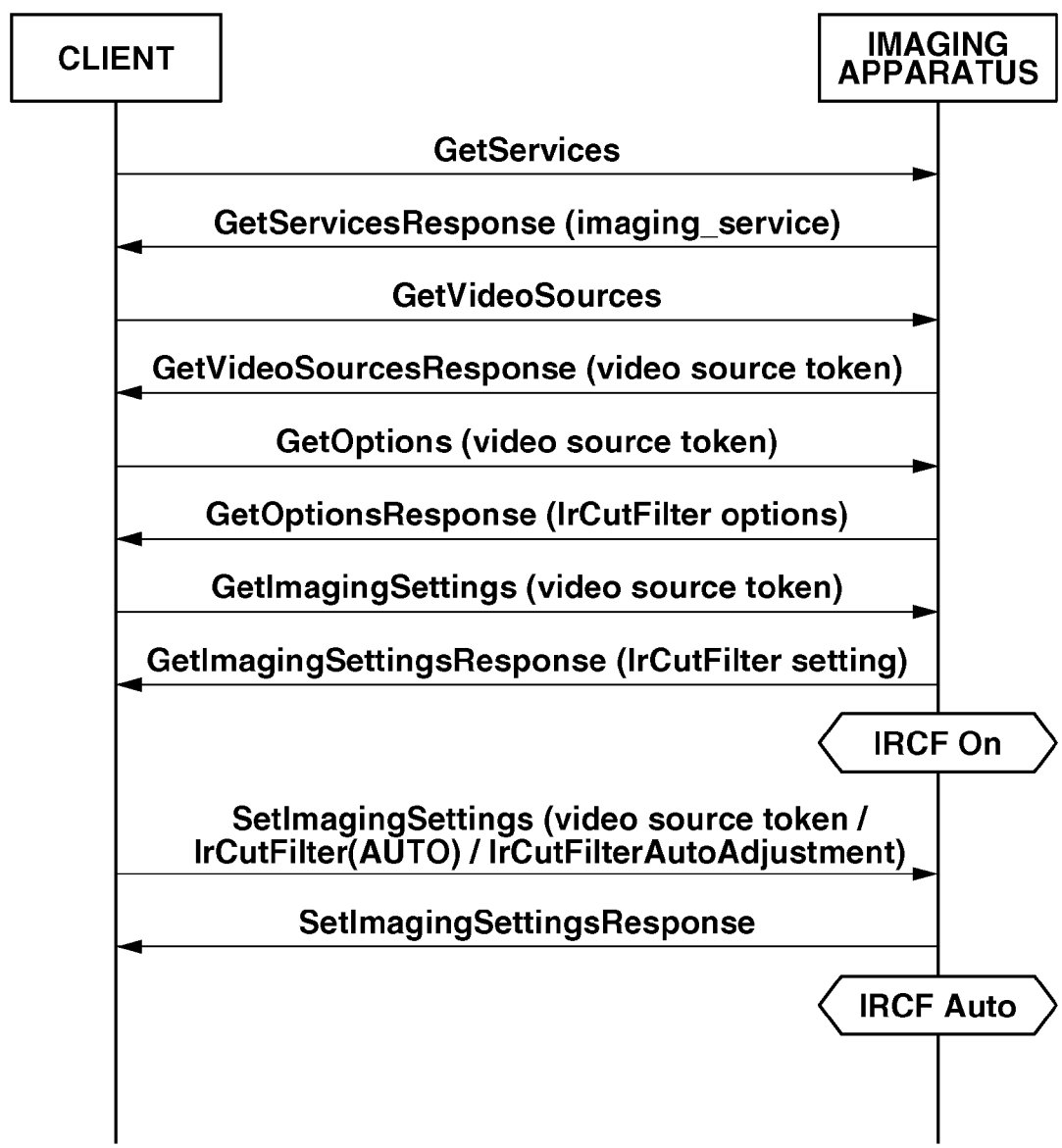
FIG. 7 is a message sequence chart illustrating the flow of control and data between the imaging apparatus and a client apparatus according to the first exemplary embodiment of the present invention.

Next, a series of operations for giving and receiving commands and responses (a command transaction), which is typical in the present exemplary embodiment, is described with reference to FIG. 7. FIG. 7 illustrates the command transaction, which is described by use of a message sequence chart defined by the International Telecommunication Union (ITU)-T Recommendation Z.120 standard. A client presented in FIG. 7 is connectable to the imaging apparatus via a network.

Referring to FIG. 7, first, the client and the imaging apparatus according to the present exemplary embodiment are interconnected via the network. The client operates as follows so as to check for the presence or absence of the above-described command (SetImagingSettings command) used to set the IRCF 4.

First, the client transmits a GetServices command to the imaging apparatus to check for the presence or absence of an Imaging Service. FIG. 7 illustrates that the imaging apparatus transmits to the client a GetServicesResponse indicating that the Imaging Service is supported by the imaging apparatus.

Then, the client transmits a GetVideoSources command to the imaging apparatus to check for a token indicating a Video Source capable of setting the IRCF 4. FIG. 7 illustrates that the imaging apparatus according to the present exemplary embodiment transmits to the client a GetVideoSourcesResponse including the token.

Then, the client transmits, to an address indicating the Imaging Service of the imaging apparatus, a GetOptions command including the token indicating the Video Source. This operation is performed to check for the presence or absence of a command for setting the IRCF 4 and for an option about the command for setting the IRCF 4. The imaging apparatus according to the present exemplary embodiment transmits to the client a GetOptionsResponse including the IrCutFilter field and an option thereof.

In the present exemplary embodiment, the GetOptions command and the GetOptionsResponse implement an acquisition function for acquiring the BoundaryType field corresponding to the above-described operation information from the imaging apparatus.

Then, to inquire of the imaging apparatus about the current status of the IRCF 4, the client transmits, to the address indicating the Imaging Service of the imaging apparatus, a GetImagingSettings command including the token indicating the Video Source (VideoSourceToken).

In response to the GetImagingSettings command, the imaging apparatus according to the present exemplary embodiment transmits a GetImagingSettingsResponse as illustrated in FIG. 7. The GetImagingSettingsResponse includes the IrCutFilter field and the IrCutFilterAutoAdjustment field indicating the current status of the IRCF 4.

Such a response enables the client to detect the current status of the imaging apparatus. In the example illustrated in FIG. 7, the IRCF 4 is inserted into the optical path.

Thus, the GetImagingSettingsResponse in the present exemplary embodiment corresponds to insertion and retraction status information indicating whether the IRCF 4 is inserted into the optical path of the imaging optical system 2 or whether the IRCF 4 is retracted from the optical path of the imaging optical system 2.

Then, to set the IRCF 4 to be automatically controlled, the client transmits, to the address indicating the Imaging Service of the imaging apparatus, a SetImagingSettings command including the token indicating the Video Source.

In the example illustrated in FIG. 7, the client sets the value of AUTO to the IrCutFilter field and sets the IrCutFilterAutoAdjustment field, and then transmits the SetImagingSettings command.

In the example illustrated FIG. 7, the imaging apparatus according to the present exemplary embodiment transmits to the client a SetImagingSettingsResponse without any arguments to indicate that the SetImagingSettings command has been successfully executed.

As described above, the brightness threshold can be set with BoundaryOffset field and the delay time can be set with the ResponseTime field, in the IrCutFilterAutoAdjustment field within the SetImagingSettings command.

Furthermore, the BoundaryOffset field and the ResponseTime field are arranged to be omissible. In addition, in the SetImagingSettings command in the present exemplary embodiment, the IrCutFilterAutoAdjustment field itself can also be omitted.

In the example illustrated FIG. 7, as the SetImagingSettings command has been successfully executed, the imaging apparatus is set to Auto, in which the imaging apparatus itself determines control over the insertion and retraction of the IRCF 4.

As described above, in the present exemplary embodiment, the IrCutFilterAutoAdjustment field within the SetImagingSettings command is arranged to be omissible. This arrangement provides an effect to improve user operability since the user is allowed to set the control of the IRCF 4 to Auto without considering the brightness threshold, the delay time, etc.

The imaging apparatus according to the present exemplary embodiment allows for the setting of the IRCF 4 irrespective of the current status of the IRCF 4. Therefore, the command transaction between the GetImagingSettings command and the GetImagingSettingsResponse can be omitted.

In addition, the client in the present exemplary embodiment may issue the GetVideoSources command without first issuing the GetServices command.

Figure 8A:
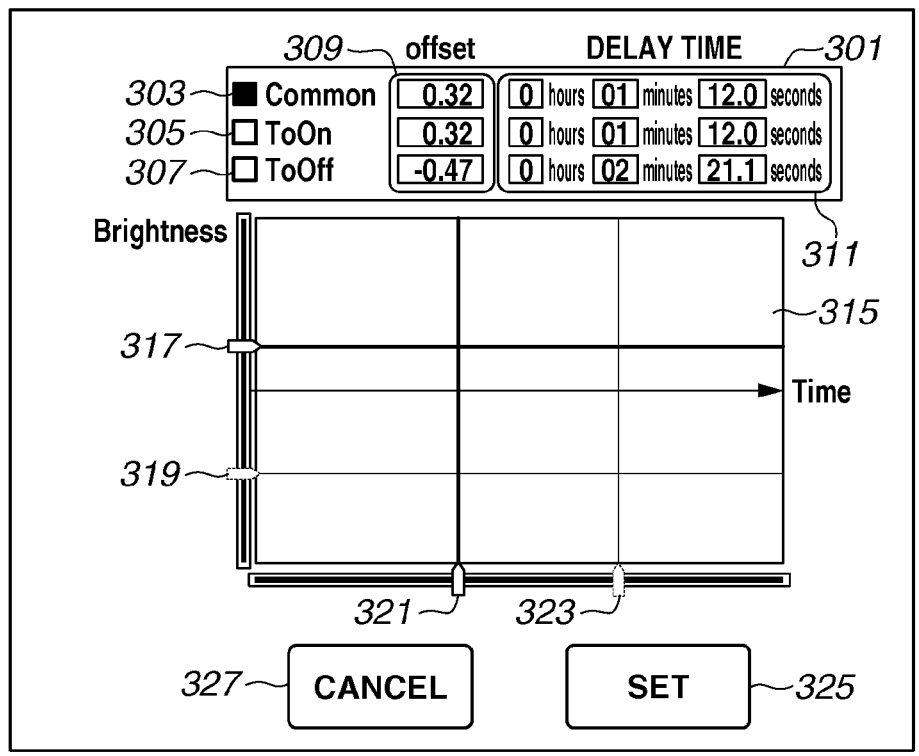
FIG. 8A illustrates a configuration example of a graphical user interface (GUI) of an external client according to the first exemplary embodiment of the present invention.
Figure 8B:
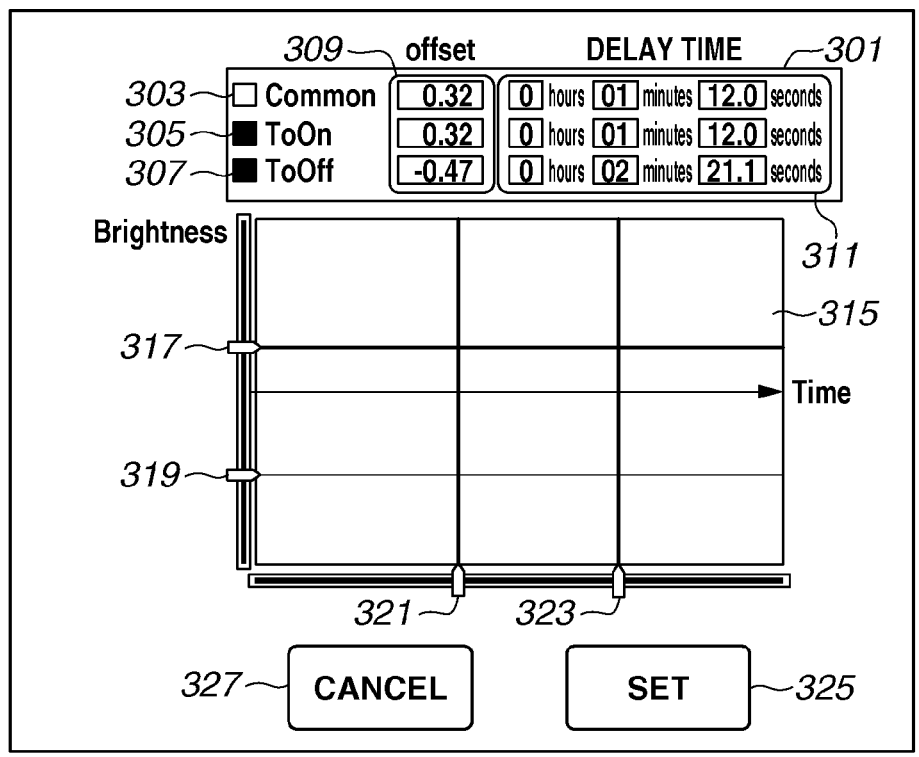
FIG. 8B illustrates a configuration example of the GUI of the external client according to the first exemplary embodiment of the present invention.
Figure 8C:
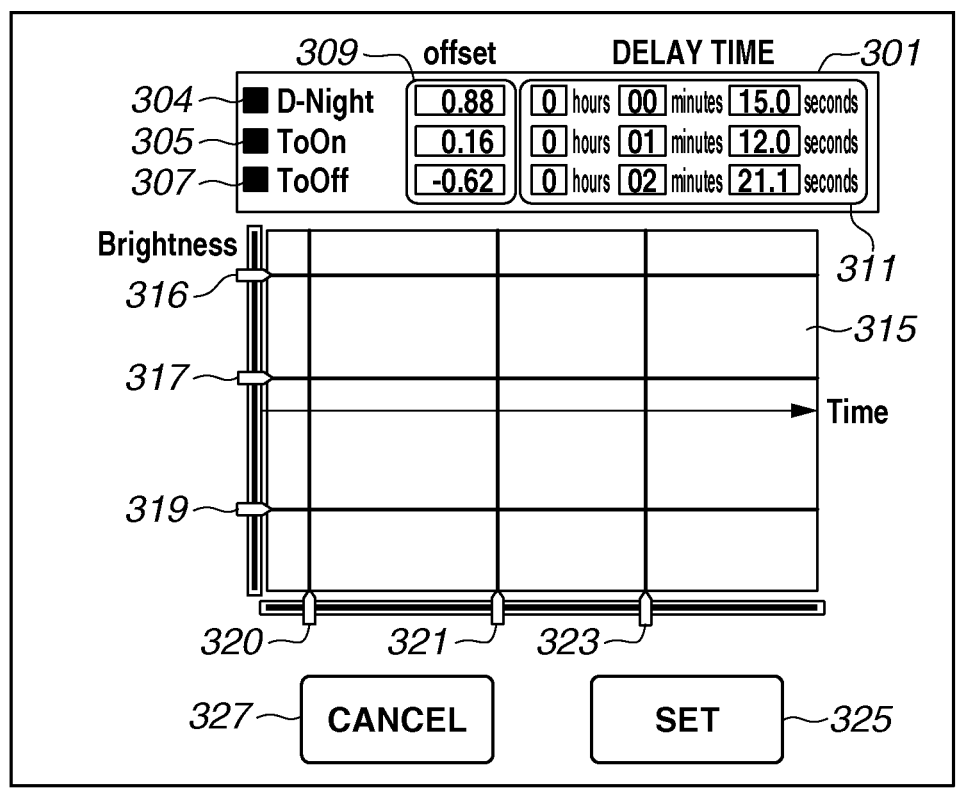
FIG. 8C illustrates a configuration example of the GUI of the external client according to the first exemplary embodiment of the present invention.

Next, an operation of the external client according to the present exemplary embodiment is described with reference to FIGS. 8A, 8B, and 8C. FIGS. 8A, 8B, and 8C illustrate configuration examples of an automatic infrared cut filter setting GUI of the external client according to the present exemplary embodiment.

Referring to FIGS. 8A, 8B, and 8C, the automatic infrared cut filter setting GUI includes an automatic infrared cut filter type selection pane 301, a Common selection checkbox 303, a ToOn selection checkbox 305, and a ToOff selection checkbox 307.

The automatic infrared cut filter setting GUI further includes a BoundaryOffset setting numeric box 309, a delay time setting numeric box 311, an automatic infrared cut filter setting pane 315, and a first brightness threshold setting scale 317.

The automatic infrared cut filter setting GUI further includes a second brightness threshold setting scale 319, a first delay time setting scale 321, a second delay time setting scale 323, a Set button 325, and a Cancel button 327. In FIGS. 8A, 8B, and 8C, the same reference numerals denote the respective same functions.

In the automatic infrared cut filter setting pane 315 illustrated in FIGS. 8A, 8B, and 8C, the vertical axis indicates the brightness value and the horizontal axis indicates time. Furthermore, in the automatic infrared cut filter setting pane 315, a brightness value of 0 (zero) is indicated on the horizontal axis (Time axis), a normalized brightness value of 1.0 is indicated on the upper limit line, and a normalized brightness value of −1.0 is indicated on the lower limit line.

In addition, in the automatic infrared cut filter setting pane 315 illustrated in FIGS. 8A, 8B, and 8C, the left-hand limit indicates a delay time of 0 (zero).

FIG. 8A illustrates a configuration example of the GUI of the external client in a case where a brightness threshold and a delay time parameter are used in common for both the retraction and the insertion of the infrared cut filter. In other words, FIG. 8A illustrates a configuration example of a GUI used to issue the SetImagingSettings command with the BoundaryType field set to Common.

In the example illustrated in FIG. 8A, the Common selection checkbox 303 is checked by the user. In this case, since the brightness threshold and the delay time parameter are used in common for both the retraction and the insertion of the infrared cut filter, the second brightness threshold setting scale 319 and the second delay time setting scale 323 are grayed out, which thus cannot be operated by the user.

In other words, the settings on the second brightness threshold setting scale 319 and the second delay time setting scale 323 are disabled.

In the example illustrated in FIG. 8A, the user can slide the first brightness threshold setting scale 317 upward or downward to set a desirable value to the BoundaryOffset field. When the user operates the first brightness threshold setting scale 317, the value of the Common-associated section in the BoundaryOffset setting numeric box 309 varies in conjunction with the first brightness threshold setting scale 317.

Furthermore, the user can directly enter a value into the Common-associated section in the BoundaryOffset setting numeric box 309. When the user enters a numerical value into the Common-associated section in the BoundaryOffset setting numeric box 309, the first brightness threshold setting scale 317 moves upward or downward in conjunction with the numerical value.

In the present exemplary embodiment, the above-described operation enables the user to roughly recognize the set value of the BoundaryOffset field based on the position of the first brightness threshold setting scale 317. Furthermore, the present exemplary embodiment can provide an effect to allow the user to correctly recognize the set value of the BoundaryOffset field based on the numerical value displayed in the BoundaryOffset setting numeric box 309.

Referring to FIG. 8A, when the user moves the first brightness threshold setting scale 317 onto the horizontal axis (onto the Time axis) and then presses the Set button 325, the external client issues the SetImagingSettings command with the BoundaryOffset field omitted.

Similarly, when the user enters a value of 0 (zero) into the Common-associated section of the BoundaryOffset setting numeric box 309 and then presses the Set button 325, the external client issues the SetImagingSettings command with the BoundaryOffset field omitted.

The above-described exemplary embodiment is arranged to enable the user to give an instruction to omit the BoundaryOffset field by moving the first brightness threshold setting scale 317 onto the horizontal axis (onto the Time axis). However, that arrangement is not a restrictive one.

For example, the external client in the present exemplary embodiment may include another GUI component used to allow the user to give an instruction to omit the BoundaryOffset field. More specifically, a BoundaryOffset field omitting checkbox may be provided on the GUI, and the user may check the checkbox to give an instruction to omit the BoundaryOffset field.

In addition, referring to FIG. 8A, the user can set a desired value to the ResponseTime field by sliding the first delay time setting scale 321 rightward or leftward. In FIG. 8A, when the user slides the first delay time setting scale 321 rightward or leftward, the time display in the Common-associated section within the delay time setting numeric box 311 is accordingly changed.

When the user directly enters time into the Common-associated section within the delay time setting numeric box 311, the first delay time setting scale 321 moves rightward or leftward according to the set value of time.

Referring to FIG. 8A, when the user moves the first delay time setting scale 321 onto the left-hand side of the automatic infrared cut filter setting pane 315 and then presses the Set button 325, the external client in the present exemplary embodiment issues the SetImagingSettings command in which the ResponseTime field is omitted.

Similarly, when the user enters a value of 0 (zero) into all of the numeric checkboxes in the Common-associated section within the delay time setting numeric box 311 and then presses the Set button 325, the external client issues the SetImagingSettings command in which the ResponseTime field is omitted.

The above-described exemplary embodiment is arranged to enable the user to give an instruction to omit the ResponseTime field by moving the first delay time setting scale 321 onto the left-hand side of the automatic infrared cut filter setting pane 315. However, that arrangement is not a restrictive one.

For example, the external client in the present exemplary embodiment may include another GUI component used to allow the user to give an instruction to omit the ResponseTime field.

More specifically, a ResponseTime field omitting checkbox may be provided on the GUI, and the user may check the checkbox to give an instruction to omit the ResponseTime field.

FIG. 8B illustrates a configuration example of the GUI of the external client in a case where different brightness thresholds and different delay time parameters are respectively used for the retraction and the insertion of the infrared cut filter. In other words, FIG. 8B illustrates a configuration example of a GUI used to issue the SetImagingSettings command with the BoundaryType field set to ToOn and ToOff.

In the example illustrated in FIG. 8B, the ToOn selection checkbox 305 and the ToOff selection checkbox 307 are checked by the user. In this case, for the insertion of the infrared cut filter, a brightness threshold set with the first brightness threshold setting scale 317 and a delay time parameter set with the first delay time setting scale 321 are used. For the retraction of the infrared cut filter, a brightness threshold set with the second brightness threshold setting scale 319 and a delay time parameter set with the second delay time setting scale 323 are used.

As described above, in the example illustrated in FIG. 8B, since the ToOn selection checkbox 305 and the ToOff selection checkbox 307 are checked, the following scales are enabled. The enabled scales include the first brightness threshold setting scale 317, the second brightness threshold setting scale 319, the first delay time setting scale 321, and the second delay time setting scale 323.

In the external client according to the present exemplary embodiment, in a case where only the ToOn selection checkbox 305 is checked, the first brightness threshold setting scale 317 and the first delay time setting scale 321 are enabled. In this case, the second brightness threshold setting scale 319 and the second delay time setting scale 323 are grayed out, which thus cannot be operated by the user.

Also, in the external client according to the present exemplary embodiment, in a case where only the ToOff selection checkbox 307 is checked, the second brightness threshold setting scale 319 and the second delay time setting scale 323 are enabled. In this case, the first brightness threshold setting scale 317 and the first delay time setting scale 321 are grayed out, which thus cannot be operated by the user.

The external client according to the present exemplary embodiment is arranged not to allow the Common selection checkbox 303, the ToOn selection checkbox 305, and the ToOff selection checkbox 307 to be checked at the same time.

For example, when the Common selection checkbox 303 is selected, the user cannot select the ToOn selection checkbox 305 and the ToOff selection checkbox 307. Also, when one of or both of the ToOn selection checkbox 305 and the ToOff selection checkbox 307 are selected, the user cannot select the Common selection checkbox 303.

Furthermore, the external client according to the present exemplary embodiment may update a GUI with a Response to the GetImagingSettings command. In this case, the external client transmits, to the imaging apparatus subjected to settings, the GetImagingSettings command together with the above-described VideoSourceToken prior to displaying the automatic infrared cut filter setting GUI.

The imaging apparatus according to the present exemplary embodiment sends the GetImagingSettingsResponse in response to the GetImagingSettings command, as described above. The GetImagingSettingsResponse includes the current status of the IRCF 4 indicated with the IrCutFilter field and the IrCutFilterAutoAdjustment field.

In the above-described IrCutFilterAutoAdjustment field, the current values of the BoundaryType field, the BoundaryOffset field, and the ResponseTime field about the imaging apparatus according to the present exemplary embodiment are described.

The external client according to the present exemplary embodiment determines displaying of the Common selection checkbox 303, the ToOn selection checkbox 305, and the ToOff selection checkbox 307 based on the value of the BoundaryType field.

When the value of the BoundaryType field is Common, the Common selection checkbox 303 is checked. Also, when ToOn is included in the BoundaryType field, the ToOn selection checkbox 305 is checked. When ToOff is included in the BoundaryType field, the ToOff selection checkbox 307 is checked.

The external client according to the present exemplary embodiment determines the display positions of the following scales based on the values of the BoundaryOffset field and the ResponseTime field corresponding to the BoundaryType field. The scales include the first brightness threshold setting scale 317, the second brightness threshold setting scale 319, the first delay time setting scale 321, and the second delay time setting scale 323.

Furthermore, the external client according to the present exemplary embodiment is arranged to terminate the automatic infrared cut filter setting operation in response to the Cancel button 327 being pressed by the user.

The imaging apparatus according to the present exemplary embodiment transmits, to the external client, the GetOptionsResponse including the IrCutFilter field and its options. The external client may be arranged to automatically update the Common selection checkbox 303, the ToOn selection checkbox 305, and the ToOff selection checkbox 307 according to the transmitted GetOptionsResponse.

For example, the external client may be arranged to display a GUI such as that illustrated in FIG. 8A in a case where Common is included in the BoundaryType field of the GetOptionsResponse. The GUI illustrated in FIG. 8A is a user interface in which the Common selection checkbox 303 is checked.

Also, the external client may be arranged to display a GUI such as that illustrated in FIG. 8B in a case where ToOn or ToOff is included in the BoundaryType field of the GetOptionsResponse. The GUI illustrated in FIG. 8B is a user interface in which the ToOn selection checkbox 305 and the ToOn selection checkbox 305 are checked.

Next, an operation performed when the external client according to the present exemplary embodiment makes settings so as to cause the imaging apparatus according to the present exemplary embodiment to perform high-sensitivity shooting is described with reference to FIG. 8C. The GUI illustrated in FIG. 8C additionally includes a D-Night setting checkbox 304, a third brightness threshold setting scale 316, and a third delay time setting scale 320. In FIG. 8C, the same reference numerals as those in FIGS. 8A and 8B denote functions similar to those in FIGS. 8A and 8B.

In the external client according to the present exemplary embodiment, when, for example, a high-sensitivity shooting setting button (not illustrated in FIG. 8C) is pressed, a high-sensitivity shooting setting GUI illustrated in FIG. 8C is displayed.

More specifically, in the external client according to the present exemplary embodiment, when the high-sensitivity shooting setting button (not illustrated in FIG. 8C) is pressed, the GUI display illustrated in FIG. 8A or 8B is updated such that the D-Night setting checkbox 304 is displayed in place of the Common selection checkbox 303.

Also, when the high-sensitivity shooting setting button (not illustrated in FIG. 8C) is pressed, the GUI display illustrated in FIG. 8A or 8B is updated such that the third brightness threshold setting scale 316 and the third delay time setting scale 320 appear on the GUI display just like the D-Night setting checkbox 304.

Referring to FIG. 8C, the user can slide the third brightness threshold setting scale 316 upward or downward to cause the imaging apparatus according to the present exemplary embodiment to set a brightness threshold used to shift from normal shooting to high-sensitivity shooting or from high-sensitivity shooting to normal shooting. Also, when the user operates the third brightness threshold setting scale 316, the value of the D-Night setting-associated section in the BoundaryOffset setting numeric box 309 varies in conjunction with the third brightness threshold setting scale 316.

Furthermore, the user can directly enter a value into the D-Night setting-associated section in the BoundaryOffset setting numeric box 309. When the user enters a numerical value into the D-Night setting-associated section in the BoundaryOffset setting numeric box 309, the third brightness threshold setting scale 316 moves upward or downward in conjunction with the numerical value.

The external client according to the present exemplary embodiment issues the above-described SetImagingSettings command based on the brightness threshold set by the user. The brightness threshold is determined based on a user's operation on the third brightness threshold setting scale 316 or the D-Night setting-associated section in the BoundaryOffset setting numeric box 309.

The external client issues a SetImagingSettings command in the BoundaryOffset field included in the IrCutFilterAutoAdjustment field in which the BoundaryType field is set to Common. The SetImagingSettings command contains the brightness threshold set by the user.

In the present exemplary embodiment, the above-described operation enables the user to roughly recognize the set value of the BoundaryOffset field usable during setting of the brightness threshold for high-sensitivity shooting based on the position of the third brightness threshold setting scale 316. Furthermore, the present exemplary embodiment can provide an effect to allow the user to correctly recognize the set value of the BoundaryOffset field based on the numerical value displayed in the BoundaryOffset setting numeric box 309.

Referring to FIG. 8C, when the user moves the third brightness threshold setting scale 316 onto the horizontal axis (onto the Time axis) and then presses the Set button 325, the external client issues the SetImagingSettings command with the BoundaryOffset field omitted.

Similarly, when the user enters a value of 0 (zero) into the D-Night setting-associated section of the BoundaryOffset setting numeric box 309 and then presses the Set button 325, the external client issues the SetImagingSettings command with the BoundaryOffset field omitted.

The above-described exemplary embodiment is arranged to enable the user to give an instruction to omit the BoundaryOffset field by moving the third brightness threshold setting scale 316 onto the horizontal axis (onto the Time axis). However, that arrangement is not a restrictive one.

For example, the external client in the present exemplary embodiment may include another GUI component used to allow the user to give an instruction to omit the BoundaryOffset field. More specifically, a BoundaryOffset field omitting checkbox may be provided on the GUI, and the user may check the checkbox to give an instruction to omit the BoundaryOffset field.

In addition, referring to FIG. 8C, the user can set a desired value to the ResponseTime field by sliding the third delay time setting scale 320 rightward or leftward. In FIG. 8C, when the user slides the third delay time setting scale 320 rightward or leftward, the time display in the D-Night setting-associated section within the delay time setting numeric box 311 is accordingly changed.

When the user directly enters time into the D-Night setting-associated section within the delay time setting numeric box 311, the third delay time setting scale 320 moves rightward or leftward according to the set value of time.

The external client according to the present exemplary embodiment issues the above-described SetImagingSettings command based on the delay time value set by the user in response to a user's operation on the third delay time setting scale 320 or the D-Night setting-associated section in the delay time setting numeric box 311.

More specifically, the external client issues a SetImagingSettings command in the ResponseTime field included in the IrCutFilterAutoAdjustment field in which the BoundaryType field is set to Common. The SetImagingSettings command contains the delay time value set by the user.

Referring to FIG. 8C, when the user moves the third delay time setting scale 320 onto the left-hand side of the automatic infrared cut filter setting pane 315 and then presses the Set button 325, the external client in the present exemplary embodiment issues the following SetImagingSettings command.

In the SetImagingSettings command, the ResponseTime field is omitted. The ResponseTime field is stored in the IrCutFilterAutoAdjustment field in which the BoundaryType field is set to Common.

Referring to FIG. 8C, when the user enters a value of 0 (zero) into all of the numeric checkboxes in the D-Night setting-associated section within the delay time setting numeric box 311 and then presses the Set button 325, the external client issues the SetImagingSettings command in which the ResponseTime field is omitted.

The above-described exemplary embodiment is arranged to enable the user to give an instruction to omit the ResponseTime field by moving the third delay time setting scale 320 onto the left-hand side of the automatic infrared cut filter setting pane 315. However, that arrangement is not a restrictive one.

Also, the above-described exemplary embodiment is arranged to enable the user to give an instruction to omit the ResponseTime field by entering a value of 0 (zero) into all of the numeric checkboxes in the D-Night setting-associated section within the delay time setting numeric box 311. However, that arrangement is not a restrictive one.

For example, the external client in the present exemplary embodiment may include another GUI component used to allow the user to give an instruction to omit the ResponseTime field. More specifically, a ResponseTime field omitting checkbox may be provided on the GUI, and the user may check the checkbox to give an instruction to omit the ResponseTime field.

In such a case, when the user moves the third delay time setting scale 320 onto the left-hand side of the automatic infrared cut filter setting pane 315, the external client issues a SetImagingSettings command. In the SetImagingSettings command, a value of 0 (zero) is stored in the ResponseTime field.

Also, when the user enters a value of 0 (zero) into all of the numeric checkboxes in the D-Night setting-associated section within the delay time setting numeric box 311, the external client issues a SetImagingSettings command in which a value of 0 (zero) is stored in the ResponseTime field.

The present exemplary embodiment controls the adjustment of parameters between high-sensitivity shooting and normal shooting by use of the IrCutFilterAutoAdjustment field in which the BoundaryType field is set to Common.

Since the high-sensitivity shooting does not involve any mechanical operation, a time of transition between high-sensitivity shooting and normal shooting can be made small. In addition, since changes of imaging parameters or image processing parameters during the transition between high-sensitivity shooting and normal shooting can be made small, any changes in captured image can be reduced.

Therefore, since the imaging apparatus according to the present exemplary embodiment allows the delay time to be set to a value of 0 (zero), the operation of the external client for allowing a value of 0 (zero) to be stored in the ResponseTime field is convenient.

Figure 9:
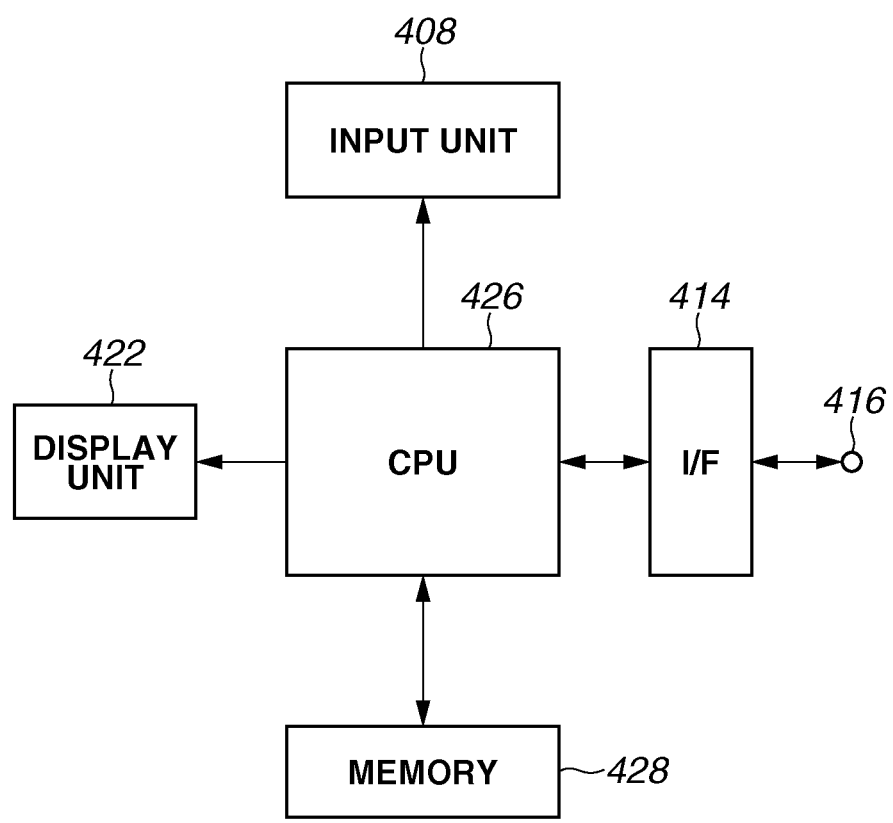
FIG. 9 is a block diagram illustrating a configuration of the client apparatus according to the first exemplary embodiment of the present invention.

Next, a configuration of the client apparatus (external client) according to the present exemplary embodiment is described with reference to FIG. 9. FIG. 9 is a block diagram illustrating a configuration of the client apparatus according to the present exemplary embodiment. Referring to FIG. 9, the client apparatus includes an input unit 408, a digital interface (hereinafter also referred to as an I/f) 414, an interface terminal 416, a display unit 422, a central processing unit (CPU) 426, and a memory 428.

The client apparatus illustrated in FIG. 9 is typically a general-purpose computer, such as a personal computer (PC). The input unit 408 is, for example, a pointing device, such as a keyboard and a mouse. The display unit is, for example, a liquid crystal display device, a plasma display device, or a cathode-ray tube (CRT) display device.

Each of the above-described GUIs illustrated in FIGS. 8A to 8C is displayed on the display unit 422. The user of the client apparatus can operate each GUI illustrated in FIGS. 8A to 8C via the input unit 408. The CPU 426 executes software for displaying the GUIs and for detecting a user operation on the input unit 408.

The memory 428 temporarily stores an intermediate result of calculation by the CPU 426 and reference data values, which can be referred to as appropriate. In the present exemplary embodiment, the operation of the client apparatus can be implemented with the above-described units.

As described above, the client apparatus is arranged to acquire from the imaging apparatus a BoundaryType field indicating for which case the imaging apparatus uses the BoundaryOffset field and the ResponseTime field.

For example, when the user sets the imaging apparatus to automatically control the insertion and retraction of the IRCF 4 into and from the optical path of the imaging optical system 2, the user may set additional information, such as the level of external brightness and the delay time about the insertion and retraction of the infrared cut filter.

In such a case, an imaging apparatus can be supposed which is capable of allowing an external client apparatus to set additional information that is used in common for both a case where the infrared cut filter is inserted into the optical path of the imaging optical system and a case where the infrared cut filter is retracted from the optical path of the imaging optical system.

However, only the setting of additional information that is used in common for both cases may not be enough depending on a circumference in which the imaging apparatus is placed. Therefore, even an imaging apparatus which is capable of allowing the external client apparatus to individually set additional information that is used for a case where the infrared cut filter is inserted into the optical path of the imaging optical system and additional information that is used for a case where the infrared cut filter is retracted from the optical path of the imaging optical system can be supposed.

However, in such a supposition, it is difficult for the user who operates the external client apparatus to recognize how the additional information is used by the imaging apparatus, which is connected to the external client apparatus. Thus, the operability of the client apparatus is not good.

Therefore, according to the present exemplary embodiment, the client apparatus is configured to acquire from the imaging apparatus a BoundaryType field indicating for which case the imaging apparatus uses the BoundaryOffset field and the ResponseTime field.

This configuration enables the client apparatus to recognize a case for which the imaging apparatus, which is connected to the external client apparatus, uses the BoundaryOffset field and the ResponseTime field. Thus, user operability can be improved.

In the present exemplary embodiment, the imaging apparatus is arranged to insert the IRCF 4 into the optical path of the imaging optical system 2, when receiving the SetImagingSettings command in which the value of the IrCutFilter field is set to ON. However, that arrangement is not a restrictive one.

For example, the imaging apparatus may be arranged to set the gain of a video signal output from the image sensor 6 to a first gain, when receiving the SetImagingSettings command in which the value of the IrCutFilter field is set to ON.

Similarly, the imaging apparatus may be arranged to perform image processing on a video signal output from the image sensor 6 such that the video signal reaches a first brightness level, when receiving the SetImagingSettings command in which the value of the IrCutFilter field is set to ON.

Also, in the present exemplary embodiment, the imaging apparatus is arranged to retract the IRCF 4 from the optical path of the imaging optical system 2, when receiving the SetImagingSettings command in which the value of the IrCutFilter field is set to OFF. However, that arrangement is not a restrictive one.

For example, the imaging apparatus may be arranged to set the gain of a video signal output from the image sensor 6 to a second gain, when receiving the SetImagingSettings command in which the value of the IrCutFilter field is set to OFF. The second gain is smaller than the first gain.

Similarly, for example, the imaging apparatus may be arranged to perform image processing on a video signal output from the image sensor 6 such that the video signal reaches a second brightness level, when receiving the SetImagingSettings command in which the value of the IrCutFilter field is set to OFF. The first brightness level is brighter than the second brightness level.

In addition, in the present exemplary embodiment, the imaging apparatus is arranged to automatically control the insertion and retraction of the IRCF 4 into and from the optical path of the imaging optical system 2, when receiving the SetImagingSettings command in which the value of the IrCutFilter field is set to AUTO. However, that arrangement is not a restrictive one.

For example, the imaging apparatus may be arranged to automatically control the gain of a video signal output from the image sensor 6, when receiving the SetImagingSettings command in which the value of the IrCutFilter field is set to AUTO.

Similarly, for example, the imaging apparatus may be arranged to automatically control image processing for increasing gain of a video signal output from the image sensor 6, when receiving the SetImagingSettings command in which the value of the IrCutFilter field is set to AUTO.

In the present exemplary embodiment, each GUI illustrated in FIGS. 8A, 8B, and 8C, the input unit 408, and the display unit 422 correspond to a user interface unit.

In the present exemplary embodiment, the Common selection checkbox 303, the ToOn selection checkbox 305, and the ToOff selection checkbox 307 correspond to a selection unit, described below The selection unit is configured to select between enabling inputting of automatic adjustment information to deal with a case where the IRCF 4 is inserted into the optical path of the imaging optical system 2 and automatic adjustment information to deal with a case where the IRCF 4 is retracted from the optical path of the imaging optical system 2 and enabling inputting of automatic adjustment information to deal with the both cases.

In addition, in the present exemplary embodiment, a GetOptionsResponse illustrated in FIG. 10B includes data with the name "IrCutFilterAutoAdjustmentOptions". The data with the name "IrCutFilterAutoAdjustmentOptions" is IrCutFilterAutoAdjustmentOptions-type data.

The data type "IrCutFilterAutoAdjustmentOptions" is defined as a complex type according to the complexType declaration in the XSD. In the data type "IrCutFilterAutoAdjustmentOptions", a sequence specifier is set to specify that the elements thereof appear in the order defined by the specifier.

For example, the first element of the IrCutFilterAutoAdjustmentOptions-type data is data with the name "BoundaryType" of the IrCutFilterAutoBoundaryType type.

The second element of the IrCutFilterAutoAdjustmentOptions-type data is data with the name "BoundaryOffset" of the single-precision floating point data type. The data with the name "BoundaryOffset" is limited in range.

The third element of the IrCutFilterAutoAdjustmentOptions-type data is data with the name "ResponseTime" of the duration time interval data type, which is defined in the Primitive Datatype in the XSD.

The second element and the third element of the IrCutFilterAutoAdjustmentOptions-type data may be specified to be omitted by a minOccurs specifier in the XSD.

In addition, the imaging apparatus according to the present exemplary embodiment may be arranged to perform the following operation when receiving, from an external client (not illustrated), a GetOptions command including the Token indicating the Video Source. The operation includes sending (transmitting), to the external client (not illustrated), a GetOptionsResponse including data with the name "IrCutFilterAutoAdjustmentOptions".

Configuration examples of the GetOptions command and the GetOptionsResponse are described below with reference to FIGS. 10A and 10B.

FIG. 10A illustrates a configuration example of the GetOptions command. The GetOptions command is transmitted with the GetOptions field including the VideoSourceToken field in which the token indicating the Video Source specified by the external client is stored, as illustrated in FIG. 10A.

FIG. 10B illustrates a configuration example of the GetOptionsResponse. The imaging apparatus sends (transmits), to the client apparatus, the GetOptionsResponse with the GetOptionsResponse field including the ImagingOptions20 field in which the following values are listed. The values include values of the IrCutFilterMode that are settable in the imaging apparatus according to the present exemplary embodiment.

In addition, the settable values of the IrCutFilterMode are described in the IrCutFilterModes field, as illustrated in FIG. 10B. The above-described IrCutFilterAutoAdjustmentOptions field is stored as illustrated in FIG. 10B.

More specifically, the IrCutFilterAutoAdjustmentOptions field is stored in the ImagingOptions20Extensions2 field included in the ImagingOptions20Extension field.

The values of the BoundaryType that are settable by the imaging apparatus according to the present exemplary embodiment are described in the Mode fields included in the IrCutFilterAutoAdjustmentOptions field, so that the settable values of the BoundaryType are listed. In the example illustrated in FIG. 10B, Common, ToOn, and ToOff are settable.

The value of the BoundaryOffset field included in the IrCutFilterAutoAdjustmentOptions field indicates whether the BoundaryOffset is settable to the imaging apparatus according to the present exemplary embodiment. In the present exemplary embodiment, the BoundaryOffset field is described in the boolean type.

In the example illustrated in FIG. 10B, the value of the BoundaryOffset field is set to all true, thus indicating that the BoundaryOffset is settable to the imaging apparatus according to the present exemplary embodiment. The value "false" of the BoundaryOffset field indicates that the value of the BoundaryOffset of the corresponding BoundaryType is unsettable.

The maximum value and minimum value of the ResponseTime that are settable by the imaging apparatus according to the present exemplary embodiment are described with the ResponseTime field included in the IrCutFilterAutoAdjustmentOptions field. The ResponseTime field is data of the DurationRange type in which the maximum value and minimum value of the time interval are listed.

In the example illustrated in FIG. 10B, the values of the ResponseTime field are set to PT0S, indicating a minimum value of 0 (zero) seconds, and PT30M, indicating a maximum value of 30 minutes. Another configuration example of the GetOptionsResponse is illustrated in FIG. 11.

While the example illustrated in FIG. 10B includes only one IrCutFilterAutoAdjustmentOptions field, the example illustrated in FIG. 11 includes a plurality of IrCutFilterAutoAdjustmentOptions fields.

Next, FIGS. 12A and 12B illustrate other configuration examples of the GetOptionsResponse.

Here, an imaging apparatus in which the IrCutFilterAutoAdjustment is settable in common for a case where the IRCF 4 is inserted into the optical path of the imaging optical system 2 and a case where the IRCF 4 is retracted from the optical path of the imaging optical system 2 is supposed. FIG. 12A illustrates the GetOptionsResponse to be transmitted by such a supposed imaging apparatus.

Furthermore, an imaging apparatus in which the IrCutFilterAutoAdjustment is settable separately for a case where the IRCF 4 is inserted into the optical path of the imaging optical system 2 and a case where the IRCF 4 is retracted from the optical path of the imaging optical system 2 is supposed. FIG. 12B illustrates the GetOptionsResponse to be transmitted by such a supposed imaging apparatus.

Referring to FIG. 12A, the <ImagingOptions20> tag is associated with three <img20:IrCutFilterModes> tags. The three <img20:IrCutFilterModes> tags are respectively associated with ON, OFF, and AUTO.

Thus, the imaging apparatus supposed in FIG. 12A can operate according to the SetImagingSettings command in which the value of the IrCutFilter field is set to ON, OFF, and AUTO.

Further referring to FIG. 12A, the <IrCutFilterAutoAdjustmentOptions> tag is associated with the following three tags. The three tags include an <img20:Modes> tag, an <img20:BoundaryOffset> tag, and an <img20:ResponseTime> tag.

The <img20:Modes> tag is associated with Common. Accordingly, the GetOptionsResponse illustrated in FIG. 12A indicates the following message.

The message indicates that information of the <IrCutFilterAutoAdjustment> tag usable by the CPU 26 can be specified in common for both a case where the IRCF 4 is inserted into the optical path of the imaging optical system 2 and a case where the IRCF 4 is retracted from the optical path of the imaging optical system 2.

The <img20:BoundaryOffset> tag is associated with true. Thus, the imaging apparatus supposed in FIG. 12A can operate according to the SetImagingSettings command in which the value associated with the <BoundaryOffset> tag is set.

In addition, the <img20:ResponseTime> tag is associated with an <img20:Min> tag and an <img20:Max> tag. Thus, the imaging apparatus supposed in FIG. 12A can operate according to the SetImagingSettings command in which a time period of 0 seconds to 30 minutes, inclusive, is set as the value associated with the <ResponseTime> tag.

Referring to FIG. 12B, just like FIG. 12A, the <ImagingOptions20> tag is associated with three <img20:IrCutFilterModes> tags. The three <img20:IrCutFilterModes> tags are respectively associated with ON, OFF, and AUTO.

Further referring to FIG. 12B, the <IrCutFilterAutoAdjustmentOptions> tag is associated with the following four tags. The four tags include two <img20:Modes> tags, an <img20:BoundaryOffset> tag, and an <img20:ResponseTime> tag.

The two <img20:Modes> tags are respectively associated with ToOn and ToOff. Accordingly, the GetOptionsResponse illustrated in FIG. 12B indicates the following message.

The message indicates that information of the <IrCutFilterAutoAdjustment> tag usable by the CPU 26 can be specified separately for a case where the IRCF 4 is inserted into the optical path of the imaging optical system 2 and a case where the IRCF 4 is retracted from the optical path of the imaging optical system 2.

The <img20:BoundaryOffset> tag is associated with true. In addition, the <img20:ResponseTime> tag is associated with an <img20:Min> tag and an <img20:Max> tag.

As illustrated in FIGS. 12A and 12B, in the present exemplary embodiment, information associated with the <img20:Modes> tag corresponds to insertion and retraction specifying information.

In addition, the imaging apparatus according to the present exemplary embodiment may be arranged to perform the following operation when receiving, from an external client (not illustrated), a GetImagingSettings command including the token indicating the Video Source. The operation includes sending (transmitting), to the external client (not illustrated), a GetImagingSettingsResponse including data with the name "IrCutFilterAutoAdjustmentOptions".

Furthermore, in the present exemplary embodiment, the value of the BoundaryType field in the SetImagingSettings command illustrated in FIG. 7 is described below.

For example, in a case where the client apparatus determines that the value of the BoundaryType field in the GetOptionsResponse illustrated in FIG. 7 is set to Common, the client apparatus performs the following processing. The processing includes transmitting, to the imaging apparatus according to the present exemplary embodiment, a SetImagingSettings command in which the value of the BoundaryType field is set to Common.

For example, in a case where the client apparatus determines that the value of the BoundaryType field in the GetOptionsResponse illustrated in FIG. 7 is set to ToOn, the client apparatus performs the following processing. The processing includes transmitting, to the imaging apparatus according to the present exemplary embodiment, a SetImagingSettings command in which the value of the BoundaryType field is set to ToOn.

For example, in a case where the client apparatus determines that the value of the BoundaryType field in the GetOptionsResponse illustrated in FIG. 7 is set to ToOff, the client apparatus performs the following processing. The processing includes transmitting, to the imaging apparatus according to the present exemplary embodiment, a SetImagingSettings command in which the value of the BoundaryType field is set to ToOff.

The BoundaryOffset and the ResponseTime in the present exemplary embodiment correspond to automatic adjustment information.

In the present exemplary embodiment, the GUIs illustrated in FIGS. 8A and 8B enable inputting of automatic adjustment information associated with the Common selection checkbox 303 when the Common selection checkbox 303 is checked (selected). In this case, the GUIs illustrated in FIGS. 8A and 8B enable inputting of automatic adjustment information associated with the ToOn selection checkbox 305 and disable inputting of automatic adjustment information associated with the ToOff selection checkbox 307.

In the present exemplary embodiment, the GUIs illustrated in FIGS. 8A, 8B, and 8C enable inputting of automatic adjustment information associated with the ToOn selection checkbox 305 when the ToOn selection checkbox 305 is checked (selected). In this case, the GUIs illustrated in FIGS. 8A, 8B, and 8C disable inputting of automatic adjustment information associated with the Common selection checkbox 303. Furthermore, in this case, the GUIs illustrated in FIGS. 8A, 8B, and 8C may disable or enable inputting of automatic adjustment information associated with the ToOff selection checkbox 307.

In the present exemplary embodiment, the GUIs illustrated in FIGS. 8A, 8B, and 8C enable inputting of automatic adjustment information associated with the ToOff selection checkbox 307 when the ToOff selection checkbox 307 is checked (selected).

In this case, the GUIs illustrated in FIGS. 8A, 8B, and 8C disable inputting of automatic adjustment information associated with the Common selection checkbox 303. Furthermore, in this case, the GUIs illustrated in FIGS. 8A, 8B, and 8C may disable or enable inputting of automatic adjustment information associated with the ToOn selection checkbox 305.

In the present exemplary embodiment, the GUI illustrated in FIG. 8C enables inputting of automatic adjustment information associated with the ToOn selection checkbox 305 and the ToOff selection checkbox 307 when the D-Night setting checkbox 304 is checked (selected).

In the present exemplary embodiment, the GUI illustrated in FIG. 8C enables inputting of automatic adjustment information associated with the D-Night setting checkbox 304 when the ToOn selection checkbox 305 is checked (selected). In this case, the GUI illustrated in FIG. 8C may disable or enable inputting of automatic adjustment information associated with the ToOff selection checkbox 307.

In the present exemplary embodiment, the GUI illustrated in FIG. 8C disables inputting of automatic adjustment information associated with the D-Night setting checkbox 304 when the ToOff selection checkbox 307 is checked (selected). In this case, the GUI illustrated in FIG. 8C may disable or enable inputting of automatic adjustment information associated with the ToOn selection checkbox 305.

The IrCutFilterAutoAdjustment field in the present exemplary embodiment can be, for example, an optional parameter generally used to adjust switching timing of the infrared cut filter only in the Auto mode.

In the present exemplary embodiment, the IrCutFilterAutoAdjustment field is also used to adjust switching timing of high-sensitivity shooting.

The BoundaryType in the present exemplary embodiment is used to specify a boundary at which parameters, such as the BoundaryOffset and ResponseTime, are used.

The boundary to be specified is, for example, a boundary used to automatically switch the infrared cut filter. The value "Common" of the BoundaryType means that the above parameters are used not only at a boundary used to automatically switch the infrared cut filter to an enabled state but also at a boundary used to automatically switch the infrared cut filter to a disabled state.

Also, the values "ToOn" and "ToOff" of the BoundaryType mean that the above parameters are used at a boundary used to automatically switch the infrared cut filter to an enabled state and at a boundary used to automatically switch the infrared cut filter to a disabled state, respectively.

In the present exemplary embodiment, the value "Common" of the BoundaryType is also used to specify a boundary used to automatically switch high-sensitivity shooting to an enabled state. Furthermore, in the present exemplary embodiment, the value "Common" of the BoundaryType is also used to specify a boundary used to automatically switch high-sensitivity shooting to a disabled state.

In addition, in the present exemplary embodiment, the values of the BoundaryOffset and the ResponseTime are made equal between a case where the value of the BoundaryType is ToOn and a case where the value of the BoundaryType is ToOff, so that the function of specifying a boundary based on the value "Common" can be implemented.

More specifically, since the values of the BoundaryOffset and the ResponseTime are equal between the value "ToOn" and the value "ToOff", the same brightness threshold and the same delay time are used for both the case of switching the infrared cut filter to an enabled state and the case of switching the infrared cut filter to a disabled state. The BoundaryType in the present exemplary embodiment corresponds to boundary type information.

In addition, the BoundaryOffset field in the present exemplary embodiment is used, for example, to adjust a boundary exposure level used to switch the infrared cut filter between an enabled state (On) and a disabled state (Off).

The value of the BoundaryOffset field is, for example, a value that is normalized into a range from −1.0 to 1.0 and has not any particular unit. The value of the BoundaryOffset field indicates an initial value at 0, the darkest vale at −1.0, and the brightest value at 1.0. The BoundaryOffset field in the present exemplary embodiment is similarly used to adjust a boundary exposure level used to switch high-sensitivity shooting between an enabled state (On) and a disabled state (Off).

In addition, the ResponseTime field in the present exemplary embodiment indicates, for example, a delay time used to switch the infrared cut filter between an enabled state (On) and a disabled state (Off) after boundary exposure levels are crossed.

The ResponseTime field in the present exemplary embodiment similarly indicates a delay time used to switch high-sensitivity shooting between an enabled state (On) and a disabled state (Off) after boundary exposure levels are crossed.

Furthermore, the client apparatus according to the present exemplary embodiment operates as a Network Video Receiver (NVR) in the ONVIF standard. Thus, the client apparatus according to the present exemplary embodiment can transmit and receive data according to the ONVIF specification.

The imaging apparatus according to the present exemplary embodiment may be arranged to set the gain of a video signal output from the image sensor 6 to a first gain instead of inserting the IRCF 4 into the optical path of the imaging optical system 2. Also, the imaging apparatus according to the present exemplary embodiment may be arranged to set the gain of a video signal output from the image sensor 6 to a second gain instead of retracting the IRCF 4 from the optical path of the imaging optical system 2. The second gain is smaller than the first gain.

In addition, the imaging apparatus according to the present exemplary embodiment may be arranged to set the gain of a video signal output from the image sensor 6 to the first gain along with inserting the IRCF 4 into the optical path of the imaging optical system 2. Also, the imaging apparatus according to the present exemplary embodiment may be arranged to set the gain of a video signal output from the image sensor 6 to the second gain along with retracting the IRCF 4 from the optical path of the imaging optical system 2.

The imaging apparatus according to the present exemplary embodiment may be arranged to perform image processing on a video signal output from the image sensor 6 such that the video signal reaches a first brightness level, instead of inserting the IRCF 4 into the optical path of the imaging optical system 2.

The imaging apparatus according to the present exemplary embodiment may be arranged to perform image processing on a video signal output from the image sensor 6 such that the video signal reaches a second brightness level, instead of retracting the IRCF 4 from the optical path of the imaging optical system 2. The first brightness level is brighter than the second brightness level.

The imaging apparatus according to the present exemplary embodiment may be arranged to perform image processing on a video signal output from the image sensor 6 such that the video signal reaches the first brightness level, along with inserting the IRCF 4 into the optical path of the imaging optical system 2.

The imaging apparatus according to the present exemplary embodiment may be arranged to perform image processing on a video signal output from the image sensor 6 such that the video signal reaches the second brightness level, along with retracting the IRCF 4 from the optical path of the imaging optical system 2.

The client apparatus according to the present exemplary embodiment may be arranged, for example, to display the GUI illustrated in FIG. 8A on the display unit 422 when receiving the GetOptionsResponse in which the value of the BoundaryType field is set to Common in FIG. 7.

Also, the client apparatus according to the present exemplary embodiment may be arranged, for example, to display the GUI illustrated in FIG. 8B on the display unit 422 when receiving the GetOptionsResponse in which the value of the BoundaryType field is set to ToOn and/or ToOff in FIG. 7.

Then, the client apparatus according to the present exemplary embodiment may be arranged, for example, to transmit the SetImagingSettings command in FIG. 7 when the Set button 325 is pressed with the GUI illustrated in FIG. 8A displayed. Similarly, the client apparatus may be arranged, for example, to transmit the SetImagingSettings command in FIG. 7 when the Set button 325 is pressed with the GUI illustrated in FIG. 8B displayed.

Furthermore, a driving power source, such as a stepping motor, may be added to the imaging apparatus according to the present exemplary embodiment, and the imaging optical system 2 may be arranged to be rotated in a panning direction or tilting direction by the added driving power source. A dome cover formed in a hemispherical shape may be added to the imaging apparatus according to the present exemplary embodiment. The dome cover is transparent and is formed to cover the imaging optical system 2.

The CPU 26 retracts the IRCF 4 from the optical path of the imaging optical system 2 when the object brightness continues to be lower than the brightness corresponding to the BoundaryOffset for a time (duration) corresponding to the ResponseTime.

Also, the CPU 26 inserts the IRCF 4 into the optical path of the imaging optical system 2 when the object brightness continues to be higher than the brightness corresponding to the BoundaryOffset for a time (duration) corresponding to the ResponseTime.

As described above, the operation information according to the present exemplary embodiment indicates any one of a case where the IRCF 4 is inserted into the optical path of the imaging optical system 2, a case where the IRCF 4 is retracted from the optical path of the imaging optical system 2, and both the cases where the IRCF 4 is inserted and where the IRCF 4 is retracted.

Figure 13:
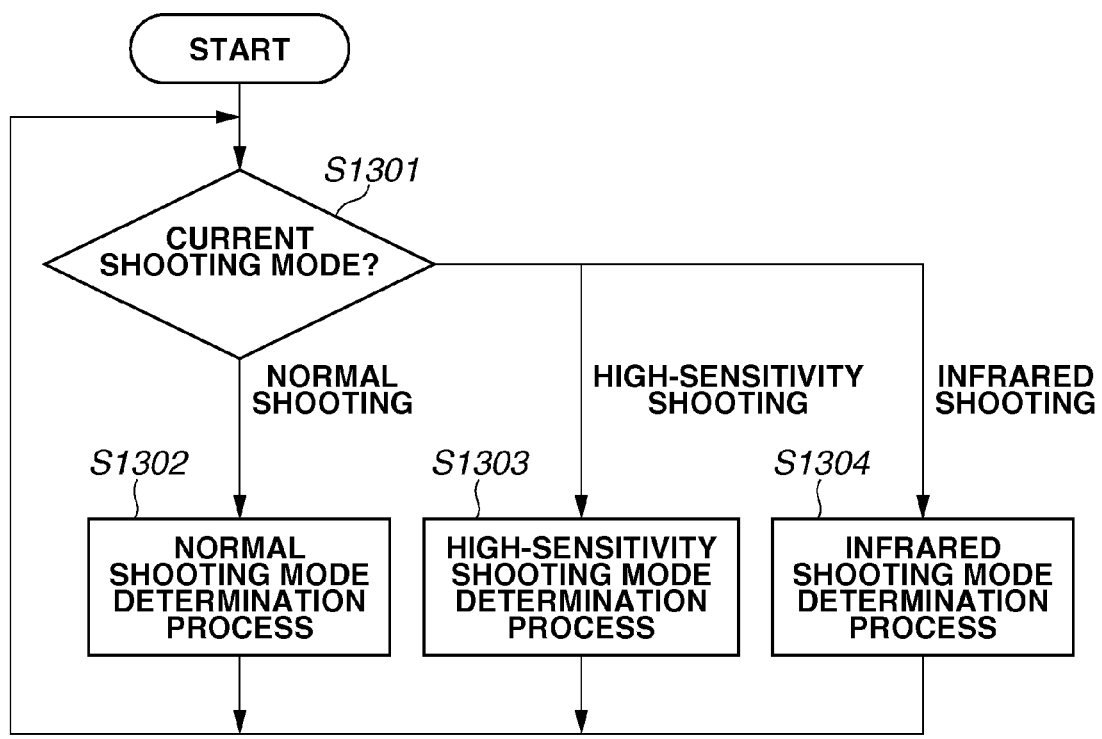
FIG. 13 is a flowchart illustrating the insertion and retraction of an infrared cut filter performed by the imaging apparatus according to the first exemplary embodiment of the present invention.

Next, a shooting mode control operation by the imaging apparatus according to the present exemplary embodiment is described with reference to FIG. 13. FIG. 13 is a flowchart illustrating a shooting mode control process performed by the imaging apparatus according to the present exemplary embodiment.

In step S1301, the CPU 26 determines whether the current shooting mode is a normal shooting mode, a high-sensitivity shooting mode, or an infrared shooting mode.

If the CPU 26 determines that the current shooting mode is the normal shooting mode (NORMAL SHOOTING in step S1301), the processing proceeds to step S1302. If the CPU 26 determines that the current shooting mode is the high-sensitivity shooting mode (HIGH-SENSITIVITY SHOOTING in step S1301), the processing proceeds to step S1303. If the CPU 26 determines that the current shooting mode is the infrared shooting mode (INFRARED SHOOTING in step S1301), the processing proceeds to step S1304.

Figure 14:
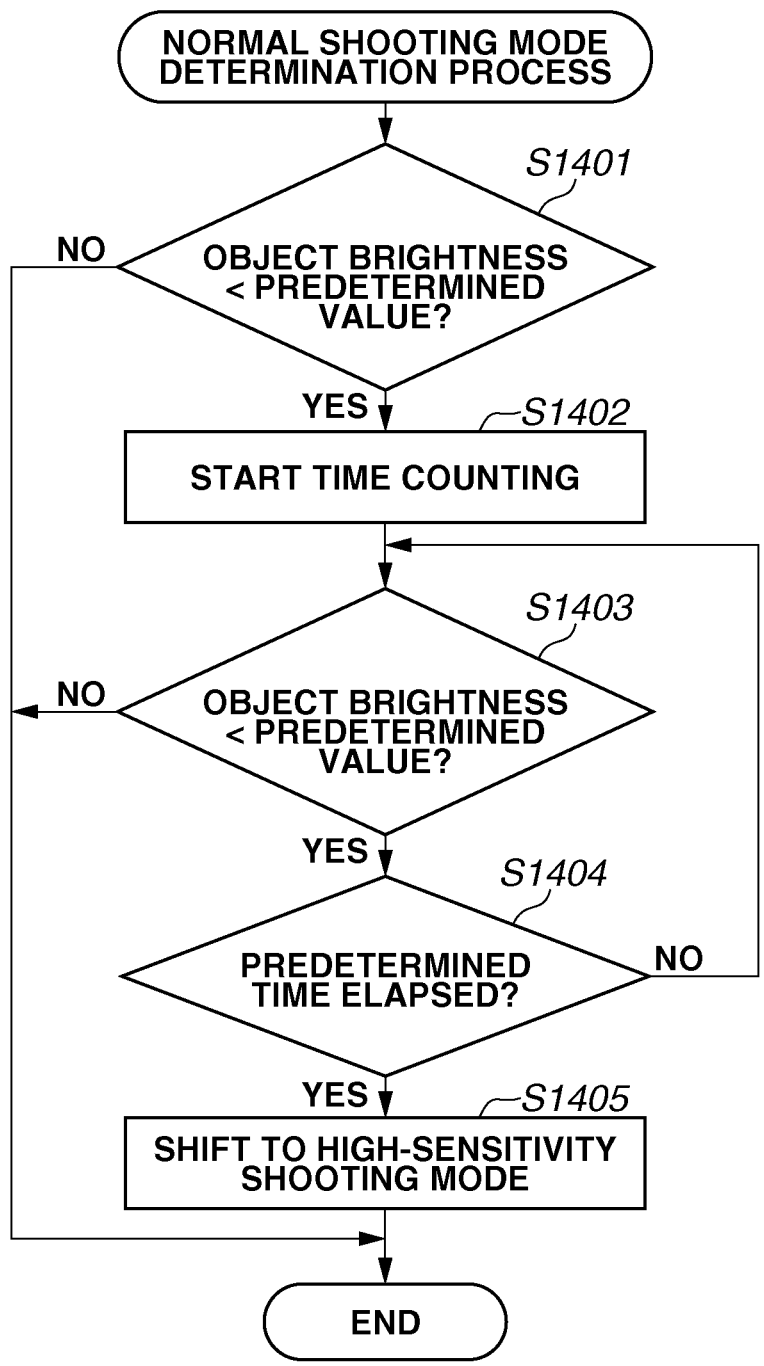
FIG. 14 is a flowchart illustrating a normal shooting mode determination process performed by the imaging apparatus according to the first exemplary embodiment of the present invention.

In step S1302, the CPU 26 performs a normal shooting mode determination process, which is described below with reference to FIG. 14.

Figure 15:
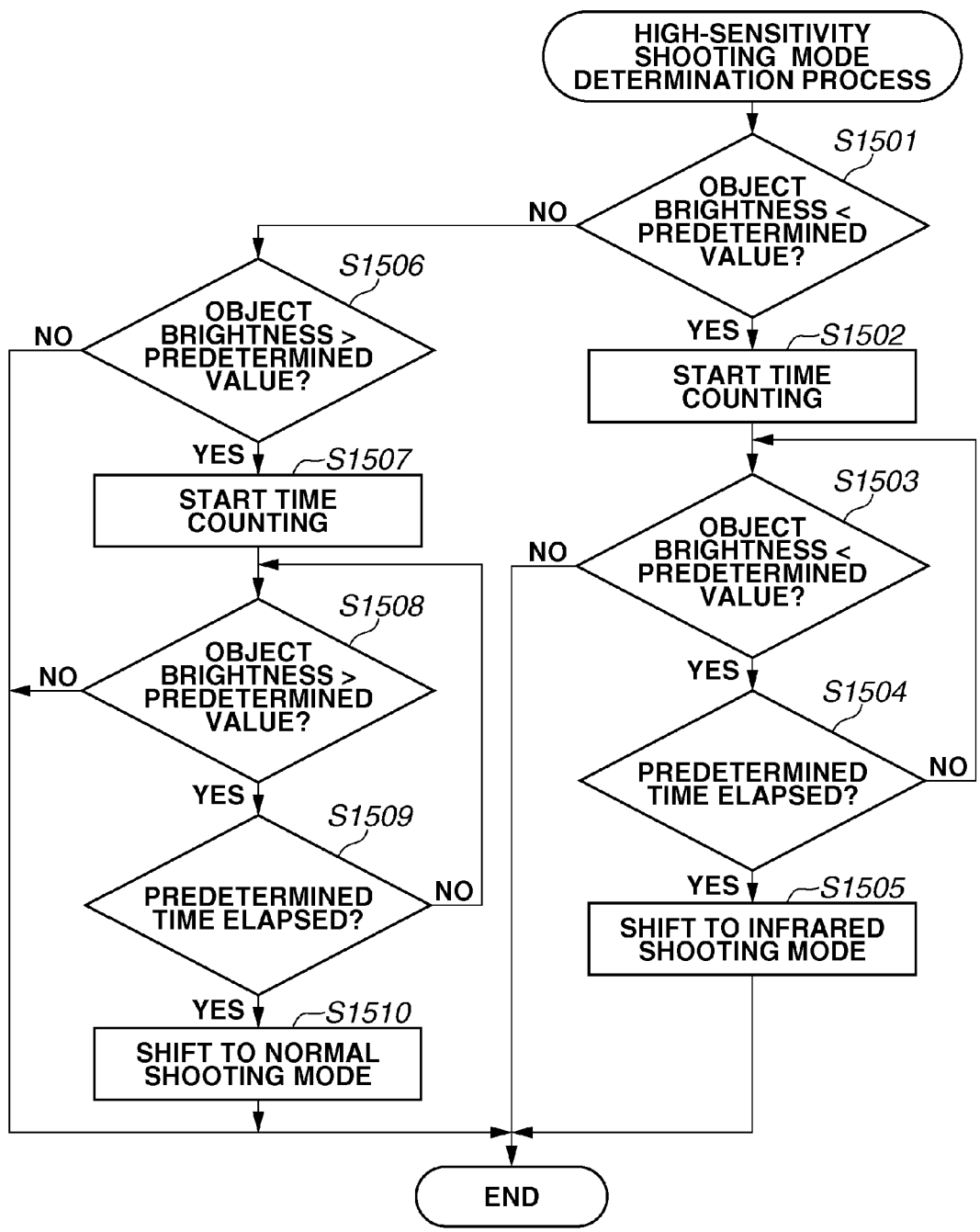
FIG. 15 is a flowchart illustrating a high-sensitivity shooting mode determination process performed by the imaging apparatus according to the first exemplary embodiment of the present invention.

In step S1303, the CPU 26 performs a high-sensitivity shooting mode determination process, which is described below with reference to FIG. 15.

Figure 16:
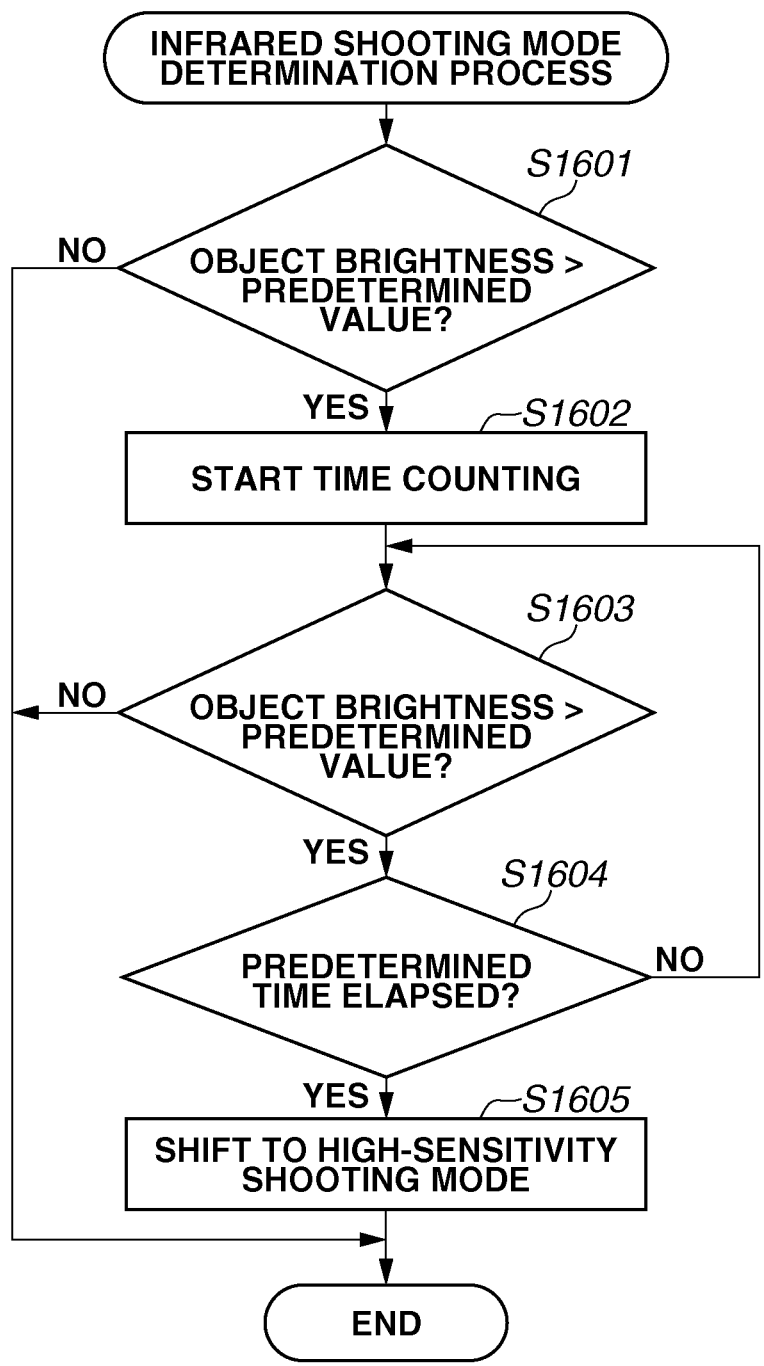
FIG. 16 is a flowchart illustrating an infrared shooting mode determination process performed by the imaging apparatus according to the first exemplary embodiment of the present invention.

In step S1304, the CPU 26 performs an infrared shooting mode determination process, which is described below with reference to FIG. 16.

Next, the normal shooting mode determination process by the imaging apparatus according to the present exemplary embodiment is described with reference to FIG. 14. FIG. 14 is a flowchart illustrating the normal shooting mode determination process performed by the imaging apparatus according to the present exemplary embodiment.

In step S1401, the CPU 26 determines whether the object brightness is lower than a predetermined brightness threshold. More specifically, the CPU 26 causes the determination circuit 20 to perform the determination based on an object brightness output from the brightness measurement circuit 18 and a value corresponding to the <BoundaryOffset> tag associated with the <BoundaryType> tag with the value set to Common.

For example, the CPU 26 retrieves, from the EEPROM 28, threshold information corresponding to the value "0.16" of the <BoundaryOffset> tag associated with the <BoundaryType> tag with the value set to Common. Then, the CPU 26 sets a brightness threshold indicated by the retrieved threshold information to the determination circuit 20.

The determination circuit 20 then determines whether the object brightness output from the brightness measurement circuit 18 is lower than the brightness threshold set by the CPU 26.

If the CPU 26 determines that the object brightness output from the brightness measurement circuit 18 is lower than the brightness threshold set by the CPU 26 (YES in step S1401), the processing proceeds to step S1402. On the other hand, if the CPU 26 determines that the object brightness output from the brightness measurement circuit 18 is not lower than the brightness threshold set by the CPU 26 (NO in step S1401), the processing returns to step S1301 in FIG. 13.

In step S1402, the CPU 26 instructs the timer circuit 22 to start time counting. More specifically, the CPU 26 sets, to the timer circuit 22, a value "1 minute 30 seconds" corresponding to the <ResponseTime> tag associated with the <BoundaryType> tag with the value set to Common, and then causes the timer circuit 22 to start time counting.

Step S1403 is similar to step S1401, and, therefore, the description thereof is not repeated.

In step S1404, the CPU 26 determines whether a predetermined time has elapsed since the start of time counting. More specifically, the CPU 26 determines whether a time-elapsed signal has been received from the timer circuit 22.

If the time-elapsed signal has been received from the timer circuit 22, the CPU 26 determines that the predetermined time has elapsed since the start of time counting (YES in step S1404), and then the processing proceeds to step S1405. On the other hand, if the time-elapsed signal has not been received from the timer circuit 22, the CPU 26 determines that the predetermined time has not elapsed since the start of time counting (NO in step S1404), and then processing returns to step S1403.

In step S1405, the CPU 26 instructs the gain setting circuit 7, the video signal processing circuit 8, and the image sensor driving circuit 23 to shift the shooting mode to the high-sensitivity shooting mode.

Next, the high-sensitivity shooting mode determination process by the imaging apparatus according to the present exemplary embodiment is described with reference to FIG. 15. FIG. 15 is a flowchart illustrating the high-sensitivity shooting mode determination process performed by the imaging apparatus according to the present exemplary embodiment.

In step S1501, the CPU 26 determines whether the object brightness is lower than a predetermined brightness threshold. More specifically, the CPU 26 causes the determination circuit 20 to perform the determination based on an object brightness output from the brightness measurement circuit 18 and a value corresponding to the <BoundaryOffset> tag associated with the <BoundaryType> tag with the value set to ToOff.

For example, the CPU 26 retrieves, from the EEPROM 28, threshold information corresponding to the value "0.16" of the <BoundaryOffset> tag associated with the <BoundaryType> tag with the value set to ToOff. Then, the CPU 26 sets a brightness threshold indicated by the retrieved threshold information to the determination circuit 20.

The determination circuit 20 then determines whether the object brightness output from the brightness measurement circuit 18 is lower than the brightness threshold set by the CPU 26.

If the CPU 26 determines that the object brightness output from the brightness measurement circuit 18 is lower than the brightness threshold set by the CPU 26 (YES in step S1501), the processing proceeds to step S1502. On the other hand, if the CPU 26 determines that the object brightness output from the brightness measurement circuit 18 is not lower than the brightness threshold set by the CPU 26 (NO in step S1501), the processing proceeds to step S1506.

In step S1502, the CPU 26 instructs the timer circuit 22 to start time counting. More specifically, the CPU 26 sets, to the timer circuit 22, a value "1 minute 30 seconds" corresponding to the <ResponseTime> tag associated with the <BoundaryType> tag with the value set to ToOff, and then causes the timer circuit 22 to start time counting.

Step S1503 is similar to step S1501, and, therefore, the description thereof is not repeated.

In step S1504, the CPU 26 determines whether a predetermined time has elapsed since the start of time counting. More specifically, the CPU 26 determines whether a time-elapsed signal has been received from the timer circuit 22.

If the time-elapsed signal has been received from the timer circuit 22, the CPU 26 determines that the predetermined time has elapsed since the start of time counting (YES in step S1504), and then the processing proceeds to step S1505. On the other hand, if the time-elapsed signal has not been received from the timer circuit 22, the CPU 26 determines that the predetermined time has not elapsed since the start of time counting (NO in step S1504), and then the processing returns to step S1503.

In step S1505, the CPU 26 instructs the IRCF driving circuit 24 to retract the IRCF 4 from the optical path of the imaging optical system 2.

In step S1506, the CPU 26 determines whether the object brightness is higher than a predetermined brightness threshold. More specifically, the CPU 26 causes the determination circuit 20 to perform the determination based on an object brightness output from the brightness measurement circuit 18 and a value corresponding to the <BoundaryOffset> tag associated with the <BoundaryType> tag with the value set to Common.

For example, the CPU 26 retrieves, from the EEPROM 28, threshold information corresponding to the value "−0.62" of the <BoundaryOffset> tag associated with the <BoundaryType> tag with the value set to Common. Then, the CPU 26 sets a brightness threshold indicated by the retrieved threshold information to the determination circuit 20.

The determination circuit 20 then determines whether the object brightness output from the brightness measurement circuit 18 is higher than the brightness threshold set by the CPU 26.

If the CPU 26 determines that the object brightness output from the brightness measurement circuit 18 is higher than the brightness threshold set by the CPU 26 (YES in step S1506), the processing proceeds to step S1507. On the other hand, if the CPU 26 determines that the object brightness output from the brightness measurement circuit 18 is not higher than the brightness threshold set by the CPU 26 (NO in step S1506), the processing returns to step S1301 in FIG. 13.

In step S1507, the CPU 26 instructs the timer circuit 22 to start time counting. More specifically, the CPU 26 sets, to the timer circuit 22, a value "1 minute 10 seconds" corresponding to the <ResponseTime> tag associated with the <BoundaryType> tag with the value set to Common, and then causes the timer circuit 22 to start time counting.

Step S1508 is similar to step S1506, and, therefore, the description thereof is not repeated.

In step S1509, the CPU 26 determines whether a predetermined time has elapsed since the start of time counting. More specifically, the CPU 26 determines whether a time-elapsed signal has been received from the timer circuit 22.

If the time-elapsed signal has been received from the timer circuit 22, the CPU 26 determines that the predetermined time has elapsed since the start of time counting (YES in step S1509), and then the processing proceeds to step S1510. On the other hand, if the time-elapsed signal has not been received from the timer circuit 22, the CPU 26 determines that the predetermined time has not elapsed since the start of time counting (NO in step S1509), and then the processing returns to step S1508.

In step S1510, the CPU 26 instructs the IRCF driving circuit 24 to insert the IRCF 4 into the optical path of the imaging optical system 2.

Next, the infrared shooting mode determination process by the imaging apparatus according to the present exemplary embodiment is described with reference to FIG. 16. FIG. 16 is a flowchart illustrating the infrared shooting mode determination process performed by the imaging apparatus according to the present exemplary embodiment.

In step S1601, the CPU 26 determines whether the object brightness is higher than a predetermined brightness threshold. More specifically, the CPU 26 causes the determination circuit 20 to perform the determination based on an object brightness output from the brightness measurement circuit 18 and a value corresponding to the <BoundaryOffset> tag associated with the <BoundaryType> tag with the value set to ToOn.

For example, the CPU 26 retrieves, from the EEPROM 28, threshold information corresponding to the value "−0.62" of the <BoundaryOffset> tag associated with the <BoundaryType> tag with the value set to ToOn. Then, the CPU 26 sets a brightness threshold indicated by the retrieved threshold information to the determination circuit 20.

The determination circuit 20 then determines whether the object brightness output from the brightness measurement circuit 18 is higher than the brightness threshold set by the CPU 26.

If the CPU 26 determines that the object brightness output from the brightness measurement circuit 18 is higher than the brightness threshold set by the CPU 26 (YES in step S1601), the processing proceeds to step S1602. On the other hand, if the CPU 26 determines that the object brightness output from the brightness measurement circuit 18 is not higher than the brightness threshold set by the CPU 26 (NO in step S1601), the processing returns to step S1301 in FIG. 13.

In step S1602, the CPU 26 instructs the timer circuit 22 to start time counting. More specifically, the CPU 26 sets, to the timer circuit 22, a value "1 minute 10 seconds" corresponding to the <ResponseTime> tag associated with the <BoundaryType> tag with the value set to ToOn, and then causes the timer circuit 22 to start time counting.

Step S1603 is similar to step S1601, and, therefore, the description thereof is not repeated.

In step S1604, the CPU 26 determines whether a predetermined time has elapsed since the start of time counting. More specifically, the CPU 26 determines whether a time-elapsed signal has been received from the timer circuit 22.

If the time-elapsed signal has been received from the timer circuit 22, the CPU 26 determines that the predetermined time has elapsed since the start of time counting (YES in step S1604), and then the processing proceeds to step S1605. On the other hand, if the time-elapsed signal has not been received from the timer circuit 22, the CPU 26 determines that the predetermined time has not elapsed since the start of time counting (NO in step S1604), and then the processing returns to step S1603.

In step S1605, the CPU 26 instructs the IRCF driving circuit 24 to insert the IRCF 4 into the optical path of the imaging optical system 2.

Figure 17:
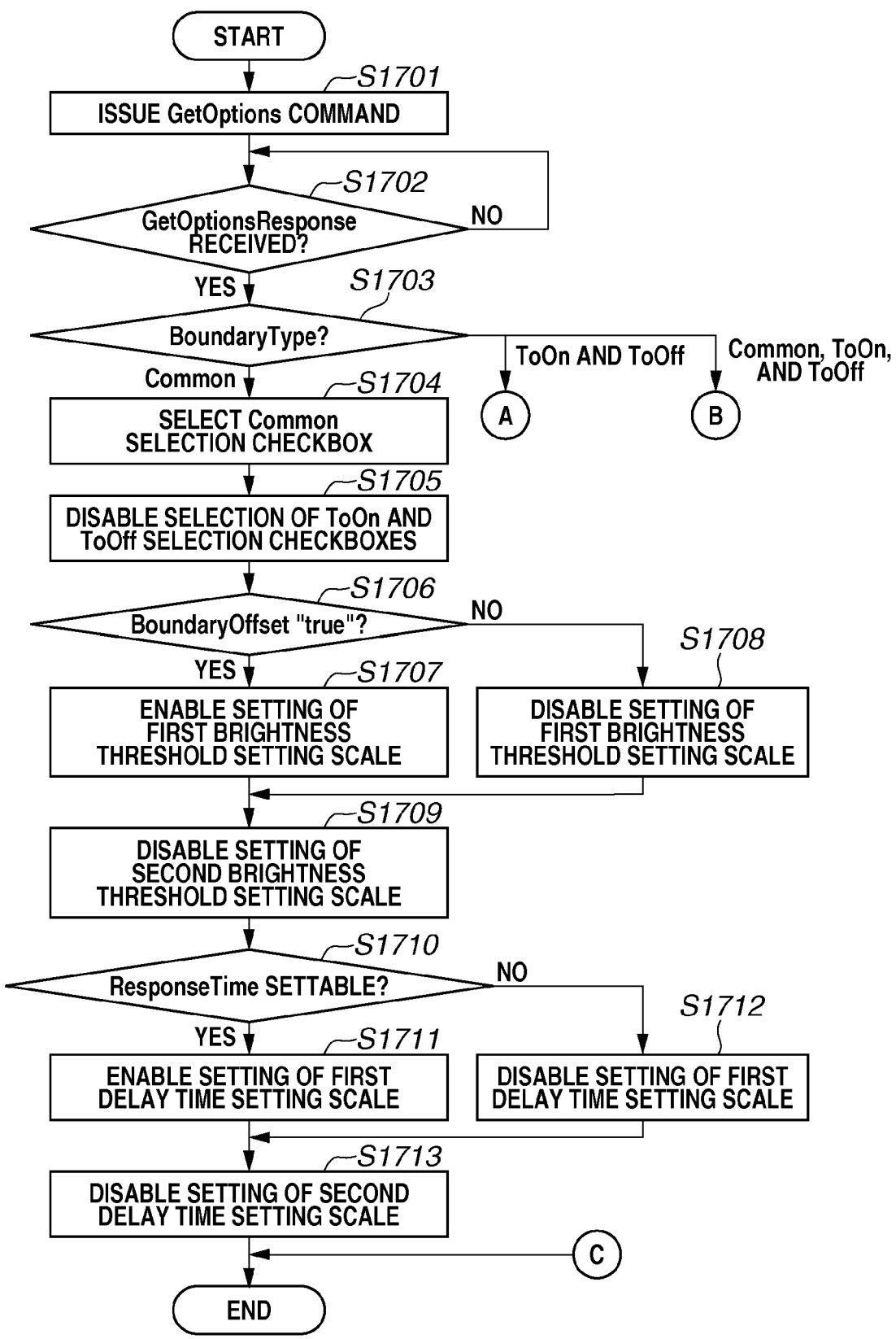
FIG. 17 is a flowchart illustrating a part of an automatic infrared cut filter setting GUI display process performed by the external client according to the first exemplary embodiment of the present invention.
Figure 18:
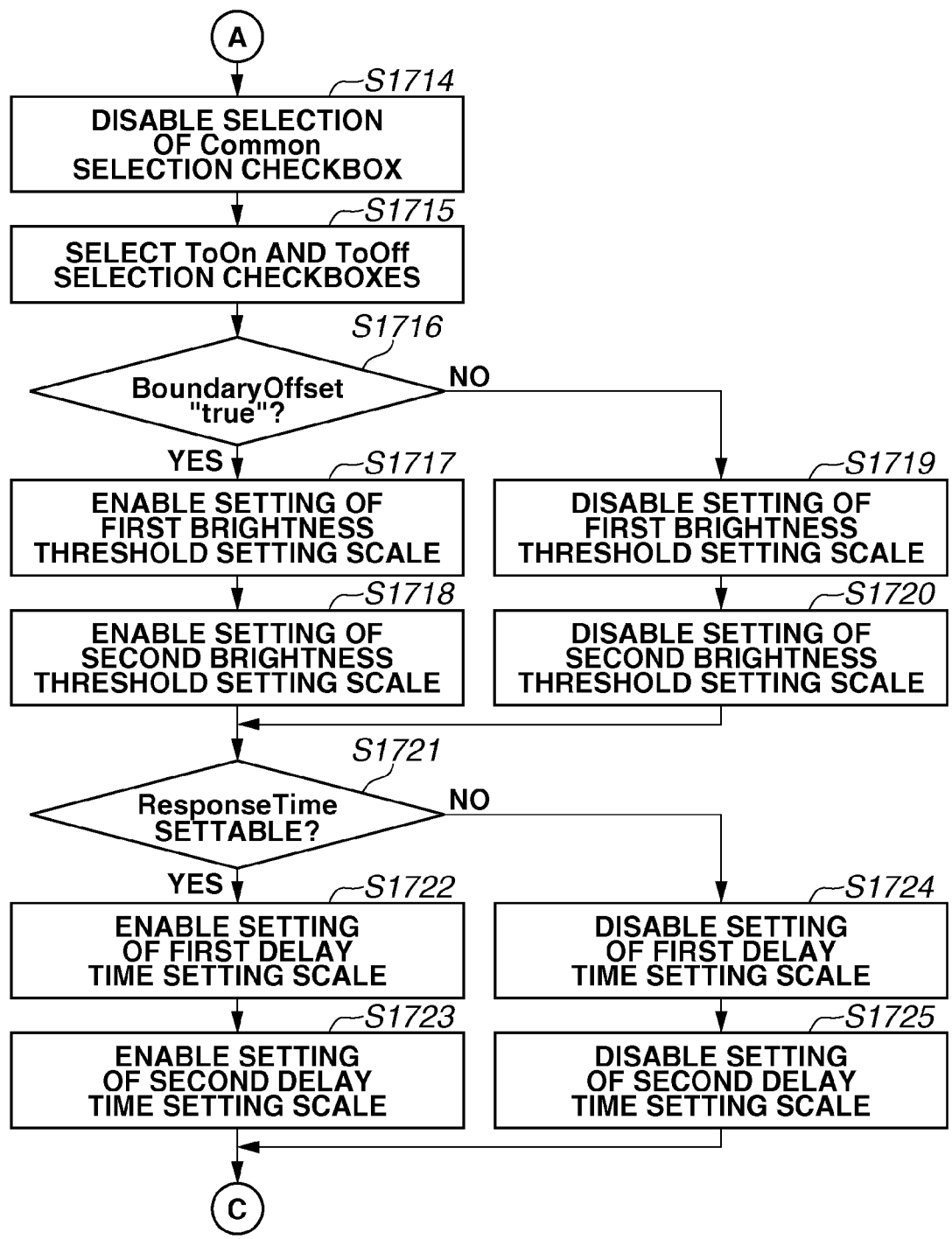
FIG. 18 is a flowchart illustrating a part of the automatic infrared cut filter setting GUI display process performed by the external client according to the first exemplary embodiment of the present invention.
Figure 19:
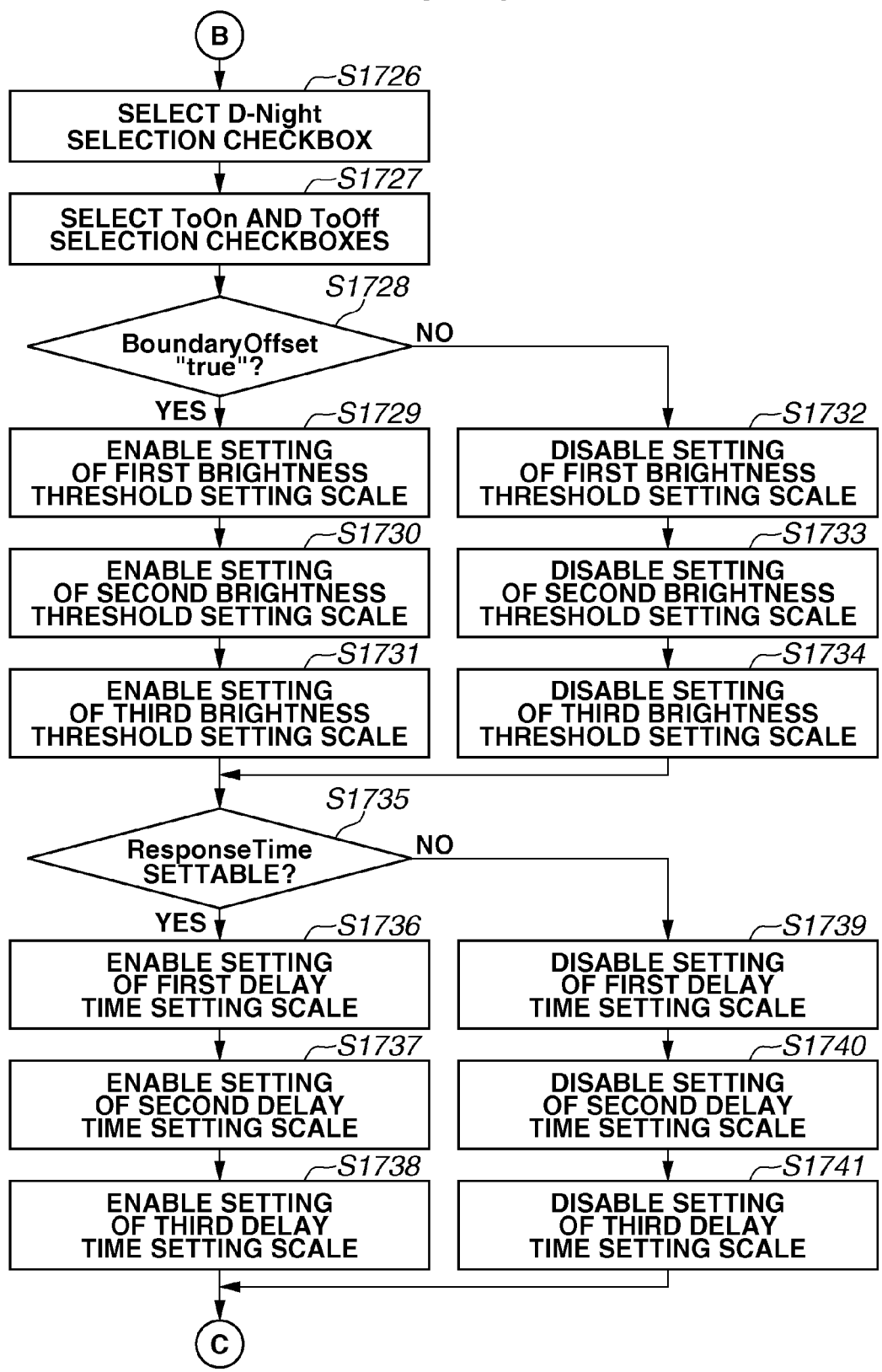
FIG. 19 is a flowchart illustrating a part of the automatic infrared cut filter setting GUI display process performed by the external client according to the first exemplary embodiment of the present invention.

Next, an automatic infrared cut filter setting GUI display process performed by the external client according to the present exemplary embodiment is described with reference to FIGS. 17 to 19. FIGS. 17 to 19 are flowcharts illustrating the automatic infrared cut filter setting GUI display process. The process illustrated in FIGS. 17 to 19 is performed by the CPU 426 after the input unit 408 inputs instructions from the user to the CPU 426.

Referring to FIG. 17, in step S1701, the CPU 426 instructs the I/F 414 to transmit the GetOptions command to the imaging apparatus according to the present exemplary embodiment.

In step S1702, the CPU 426 determines whether the GetOptionsResponse has been received from the imaging apparatus according to the present exemplary embodiment.

If the CPU 426 determines that the GetOptionsResponse has been received from the imaging apparatus according to the present exemplary embodiment (YES in step S1702), the processing proceeds to step S1703. On the other hand, if the CPU 426 determines that the GetOptionsResponse has not been received from the imaging apparatus according to the present exemplary embodiment (NO in step S1702), the processing repeats step S1702.

In step S1703, the CPU 426 determines which of the following values a value corresponding to the <img20: Modes> tag in the GetOptionsResponse determined to have been received in step S1702 is. The values include "Common", "ToOn and ToOff", and "Common, ToOn, and ToOff".

If the CPU 426 determines that the value corresponding to the <img20:Modes> tag in the GetOptionsResponse determined to have been received in step S1702 is Common (Common in step S703), the processing proceeds to step S1704.

On the other hand, if the CPU 426 determines that the value corresponding to the <img20:Modes> tag in the GetOptionsResponse determined to have been received in step S1702 is ToOn and ToOff (ToOn AND ToOff in step S703), the processing proceeds to step S1714. Processing in step S1714 is described below.

Also, if the CPU 426 determines that the value corresponding to the <img20:Modes> tag in the GetOptionsResponse determined to have been received in step S1702 is Common, ToOn, and ToOff (Common, ToOn, AND ToOff in step S703), the processing proceeds to step S1726.

In step S1704, the CPU 426 checks (selects) the Common selection checkbox 303 in the automatic infrared cut filter setting GUI.

In step S1705, the CPU 426 disables selection of the ToOn selection checkbox 305 and the ToOff selection checkbox 307 in the automatic infrared cut filter setting GUI.

In step S1706, the CPU 426 determines whether a value corresponding to the <img20:BoundaryOffset> tag in the GetOptionsResponse determined to have been received in step S1702 is true. If the value corresponding to the <img20:BoundaryOffset> tag in the GetOptionsResponse determined to have been received in step S1702 is true (YES in step S1706), the processing proceeds to step S1707.

On the other hand, if the value corresponding to the <img20:BoundaryOffset> tag in the GetOptionsResponse determined to have been received in step S1702 is not true (NO in step S1706), the processing proceeds to step S1708.

In step S1707, the CPU 426 enables setting of the first brightness threshold setting scale 317 and the Common-associated section in the BoundaryOffset setting numeric box 309 in the automatic infrared cut filter setting GUI.

In step S1708, the CPU 426 disables setting of the first brightness threshold setting scale 317 and the Common-associated section in the BoundaryOffset setting numeric box 309 in the automatic infrared cut filter setting GUI.

In step S1708, the CPU 426 disables setting of the second brightness threshold setting scale 319 and the ToOn-associated section and the ToOff-associated section in the BoundaryOffset setting numeric box 309 in the automatic infrared cut filter setting GUI.

In step S1710, the CPU 426 determines whether the GetOptionsResponse determined to have been received in step S1702 includes the <img20:ResponseTime> tag. If the CPU 426 determines that the GetOptionsResponse determined to have been received in step S1702 includes the <img20:ResponseTime> tag (YES in step S1710), the processing proceeds to step S1711.

On the other hand, if the CPU 426 determines that the GetOptionsResponse determined to have been received in step S1702 does not include the <img20:ResponseTime> tag (NO in step S1710), the processing proceeds to step S1712.

In step S1711, the CPU 426 enables setting of the first delay time setting scale 321 and the Common-associated section in the delay time setting numeric box 311 in the automatic infrared cut filter setting GUI.

In step S1712, the CPU 426 disables setting of the first delay time setting scale 321 and the Common-associated section in the delay time setting numeric box 311 in the automatic infrared cut filter setting GUI.

In step S1713, the CPU 426 disables setting of the second delay time setting scale 323 and the ToOn-associated section and the ToOff-associated section in the delay time setting numeric box 311 in the automatic infrared cut filter setting GUI.

Referring to FIG. 18, in step S1714, the CPU 426 disables selection of the Common selection checkbox 303 in the automatic infrared cut filter setting GUI.

In step S1715, the CPU 426 checks (selects) the ToOn selection checkbox 305 and the ToOff selection checkbox 307 in the automatic infrared cut filter setting GUI.

Step S1716 is similar to step S1706, and, therefore, the description thereof is not repeated.

In step S1717, the CPU 426 enables setting of the first brightness threshold setting scale 317 in the automatic infrared cut filter setting GUI. Additionally, the CPU 426 disables setting of the Common-associated section in the BoundaryOffset setting numeric box 309 in the automatic infrared cut filter setting GUI.

In step S1718, the CPU 426 enables setting of the second brightness threshold setting scale 319 and the ToOn-associated section and the ToOff-associated section in the BoundaryOffset setting numeric box 309 in the automatic infrared cut filter setting GUI.

Step S1719 is similar to step S1708, and, therefore, the description thereof is not repeated.

Step S1720 is similar to step S1709, and, therefore, the description thereof is not repeated.

Step S1721 is similar to step S1710, and, therefore, the description thereof is not repeated.

In step S1722, the CPU 426 enables setting of the first delay time setting scale 321 and the ToOn-associated section and the ToOff-associated section in the delay time setting numeric box 311 in the automatic infrared cut filter setting GUI.

In step S1723, the CPU 426 enables setting of the second delay time setting scale 323 and the ToOn-associated section and the ToOff-associated section in the delay time setting numeric box 311 in the automatic infrared cut filter setting GUI.

Step S1724 is similar to step S1712, and, therefore, the description thereof is not repeated.

Step S1725 is similar to step S1713, and, therefore, the description thereof is not repeated.

Referring to FIG. 19, in step S1726, the CPU 426 checks (selects) the D-night selection checkbox 304 in the automatic infrared cut filter setting GUI.

Step S1727 is similar to step S1715, and, therefore, the description thereof is not repeated.

Step S1728 is similar to step S1706, and, therefore, the description thereof is not repeated.

Step S1729 is similar to step S1707, and, therefore, the description thereof is not repeated.

Step S1730 is similar to step S1718, and, therefore, the description thereof is not repeated.

In step S1731, the CPU 426 enables setting of the third brightness threshold setting scale 316 and the D-Night setting-associated section in the D-Night setting checkbox 304 in the automatic infrared cut filter setting GUI.

Step S1732 is similar to step S1708, and, therefore, the description thereof is not repeated.

Step S1733 is similar to step S1720, and, therefore, the description thereof is not repeated.

In step S1734, the CPU 426 disables setting of the third brightness threshold setting scale 316 and the D-Night setting-associated section in the D-Night setting checkbox 304 in the automatic infrared cut filter setting GUI.

Step S1735 is similar to step S1710, and, therefore, the description thereof is not repeated.

Step S1736 is similar to step S1711, and, therefore, the description thereof is not repeated.

Step S1737 is similar to step S1723, and, therefore, the description thereof is not repeated.

In step S1738, the CPU 426 enables setting of the third delay time setting scale 320 and the D-Night setting-associated section in the BoundaryOffset setting numeric box 309 in the automatic infrared cut filter setting GUI.

Step S1739 is similar to step S1712, and, therefore, the description thereof is not repeated.

Step S1740 is similar to step S1713, and, therefore, the description thereof is not repeated.

In step S1741, the CPU 426 disables setting of the third delay time setting scale 320 and the D-Night setting-associated section, the ToOn-associated section, and the ToOff-associated section in the delay time setting numeric box 311 in the automatic infrared cut filter setting GUI.

Figure 20:
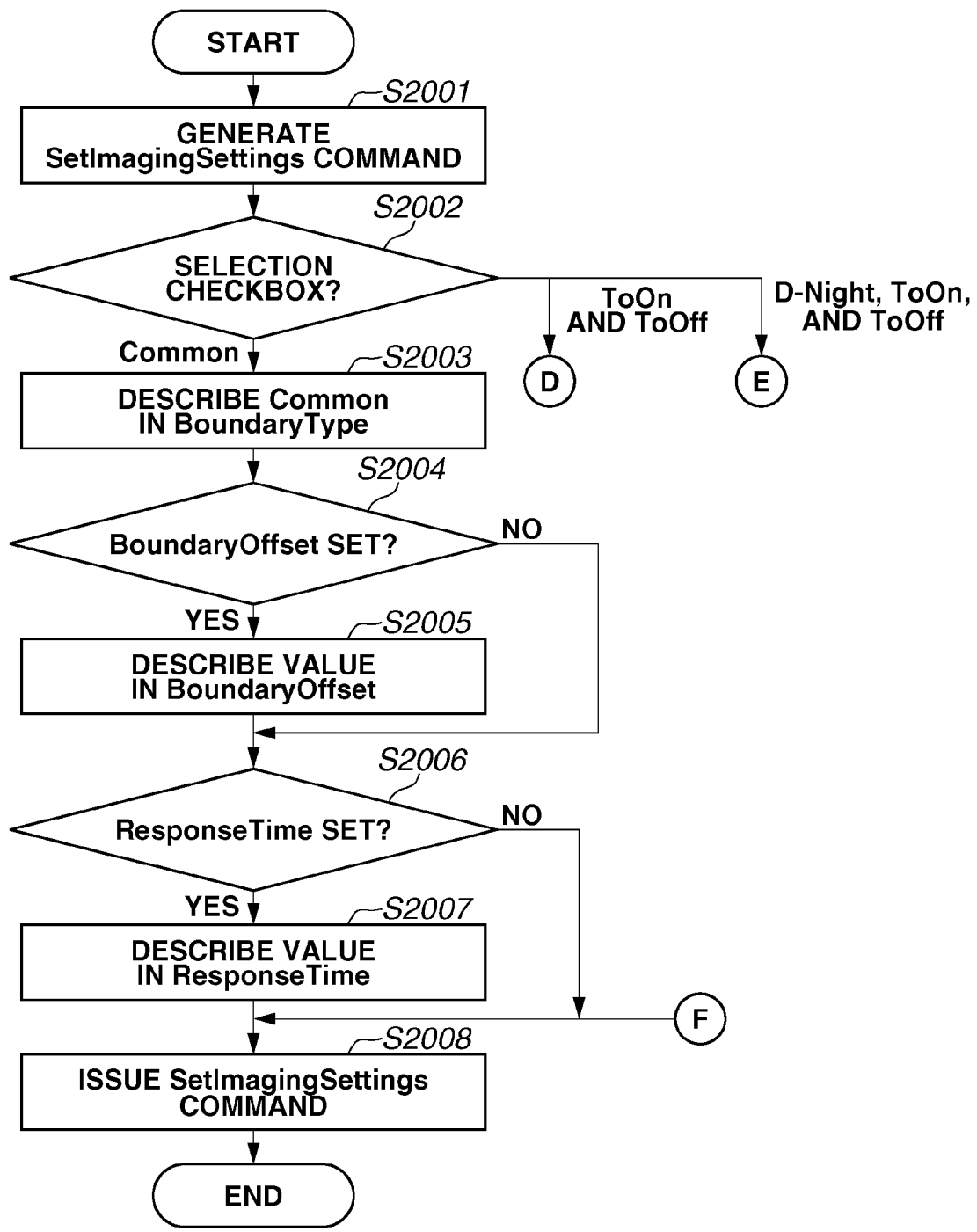
FIG. 20 is a flowchart illustrating a part of a SetImagingSettings command issuance process performed by the external client according to the first exemplary embodiment of the present invention.
Figure 21:
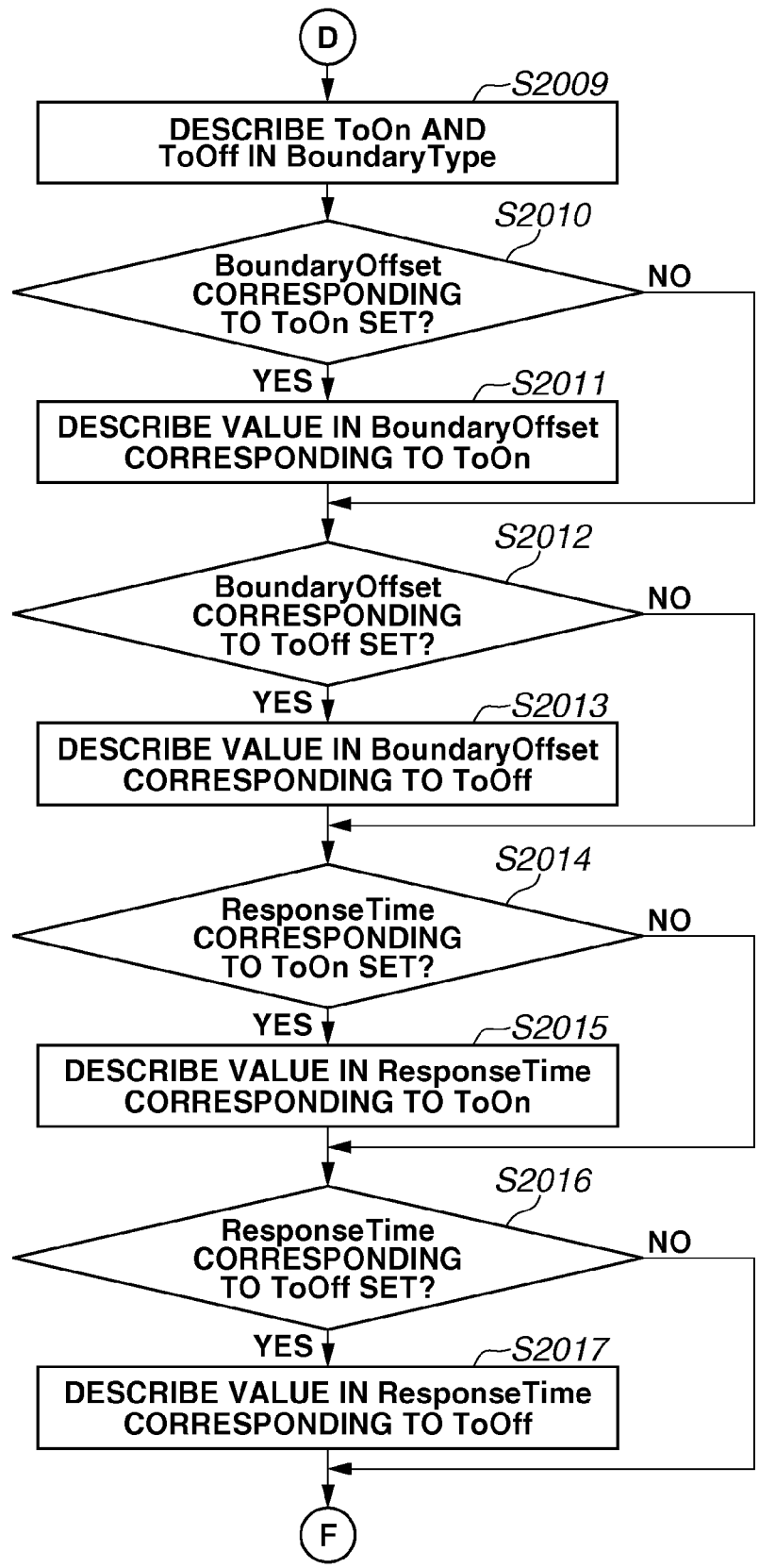
FIG. 21 is a flowchart illustrating a part of the SetImagingSettings command issuance process performed by the external client according to the first exemplary embodiment of the present invention.

Next, a SetImagingSettings command issuance process performed by the external client according to the present exemplary embodiment is described with reference to FIGS. 20 to 22. FIGS. 20 to 22 are flowcharts illustrating the SetImagingSettings command issuance process. The process illustrated in FIGS. 20 to 22 is performed by the CPU 426 after the input unit 408 inputs instructions from the user to the CPU 426.

For example, the CPU 426 determines whether the Set button 325 in the automatic infrared cut filter setting GUI has been pressed. Then, when determining that the Set button 325 has been pressed, the CPU 426 starts the process illustrated in FIGS. 20 to 22. When determining that the Set button 325 has not been pressed, the CPU 426 does not start the process illustrated in FIGS. 20 to 22.

In step S2001, the CPU 426 generates a SetImagingSettings command such as that illustrated in FIG. 4A, and causes the memory 428 to store the generated SetImagingSettings command. Here, a value corresponding to the <IrCutFilter> tag in the SetImagingSettings command is AUTO.

In step S2002, the CPU 426 determines a selective state of each of the Common selection checkbox 303, the D-Night selection checkbox 304, the ToOn selection checkbox 305, and the ToOff selection checkbox 307.

More specifically, if the CPU 426 determines that the Common selection checkbox 303 is selected (Common in step S2002), the processing proceeds to step S2003. If the CPU 426 determines that the ToOn selection checkbox 305 and the ToOff selection checkbox 307 are selected (ToOn AND ToOff in step S2002), the processing proceeds to step S2009.

Also, if the CPU 426 determines that the D-Night selection checkbox 304, the ToOn selection checkbox 305, and the ToOff selection checkbox 307 are selected (D-Night, ToOn, AND ToOff in step S2002), the processing proceeds to step S2018.

In step S2003, the CPU 426 adds, to the SetImagingSettings command stored in the memory 428 in step S2001, a description corresponding to the <BoundaryType> tag with the value set to Common.

Accordingly, the <BoundaryType> tag with the value set to Common is associated with the <IrCutFilterAutoAdjustment> tag in the SetImagingSettings command.

In step S2004, the CPU 426 determines whether a value is set to the Common-associated section in the BoundaryOffset setting numeric box 309. If the CPU 426 determines that a value is set to the Common-associated section in the BoundaryOffset setting numeric box 309 (YES in step S2004), the processing proceeds to step S2005.

On the other hand, if the CPU 426 determines that a value is not set to the Common-associated section in the BoundaryOffset setting numeric box 309 (NO in step S2004), the processing proceeds to step S2006.

In step S2005, the CPU 426 adds, to the SetImagingSettings command stored in the memory 428 in step S2001, a description corresponding to the <BoundaryOffset> tag in which the value determined to be set in step S2004 is set.

Accordingly, the <BoundaryOffset> tag in which the value determined to be set in step S2004 is set is associated with the <IrCutFilterAutoAdjustment> tag in the SetImagingSettings command.

In step S2006, the CPU 426 determines whether a value is set to the Common-associated section in the delay time setting numeric box 311. If the CPU 426 determines that a value is set to the Common-associated section in the delay time setting numeric box 311 (YES in step S2006), the processing proceeds to step S2007.

On the other hand, if the CPU 426 determines that a value is not set to the Common-associated section in the delay time setting numeric box 311 (NO in step S2006), the processing proceeds to step S2008.

In step S2007, the CPU 426 adds, to the SetImagingSettings command stored in the memory 428 in step S2001, a description corresponding to the <ResponseTime> tag in which the value determined to be set in step S2006 is set.

Accordingly, a description corresponding to the <ResponseTime> tag in which the value determined to be set in step S2006 is set is associated with the <IrCutFilterAutoAdjustment> tag in the SetImagingSettings command.

In step S2008, the CPU 426 instructs the I/F 414 to transmit the SetImagingSettings command stored in the memory 428 in step S2001 to the imaging apparatus according to the present exemplary embodiment.

Referring to FIG. 21, in step S2009, the CPU 426 adds, to the SetImagingSettings command stored in the memory 428 in step S2001, descriptions corresponding to the following first and second <IrCutFilterAutoAdjustment> tags.

The first <IrCutFilterAutoAdjustment> tag includes the <BoundaryType> tag with the value set to ToOn. The second <IrCutFilterAutoAdjustment> tag includes the <BoundaryType> tag with the value set to ToOff.

In step S2010, the CPU 426 determines whether a value is set to the ToOn-associated section in the BoundaryOffset setting numeric box 309. If the CPU 426 determines that a value is set to the ToOn-associated section in the BoundaryOffset setting numeric box 309 (YES in step S2010), the processing proceeds to step S2011.

On the other hand, if the CPU 426 determines that a value is not set to the ToOn-associated section in the BoundaryOffset setting numeric box 309 (NO in step S2010), the processing proceeds to step S2012.

In step S2011, the CPU 426 adds, to the first <IrCutFilterAutoAdjustment> tag included in the SetImagingSettings command stored in the memory 428 in step S2001, a description corresponding to the <BoundaryOffset> tag in which the value determined to be set in step S2010 is set.

Accordingly, the <BoundaryOffset> tag in which the value determined to be set in step S2010 is set is associated with the first <IrCutFilterAutoAdjustment> tag in the SetImagingSettings command.

In step S2012, the CPU 426 determines whether a value is set to the ToOff-associated section in the BoundaryOffset setting numeric box 309. If the CPU 426 determines that a value is set to the ToOff-associated section in the BoundaryOffset setting numeric box 309 (YES in step S2012), the processing proceeds to step S2013.

On the other hand, if the CPU 426 determines that a value is not set to the ToOff-associated section in the BoundaryOffset setting numeric box 309 (NO in step S2012), the processing proceeds to step S2014.

In step S2013, the CPU 426 adds, to the second <IrCutFilterAutoAdjustment> tag included in the SetImagingSettings command stored in the memory 428 in step S2001, a description corresponding to the <BoundaryOffset> tag in which the value determined to be set in step S2012 is set.

In step S2014, the CPU 426 determines whether a value is set to the ToOn-associated section in the delay time setting numeric box 311. If the CPU 426 determines that a value is set to the ToOn-associated section in the delay time setting numeric box 311 (YES in step S2014), the processing proceeds to step S2015.

On the other hand, if the CPU 426 determines that a value is not set to the ToOn-associated section in the delay time setting numeric box 311 (NO in step S2014), the processing proceeds to step S2016.

In step S2015, the CPU 426 adds, to the first <IrCutFilterAutoAdjustment> tag included in the SetImagingSettings command stored in the memory 428 in step S2001, a description corresponding to the <ResponseTime> tag in which the value determined to be set in step S2014 is set.

In step S2016, the CPU 426 determines whether a value is set to the ToOff-associated section in the delay time setting numeric box 311. If the CPU 426 determines that a value is set to the ToOff-associated section in the delay time setting numeric box 311 (YES in step S2016), the processing proceeds to step S2017.

On the other hand, if the CPU 426 determines that a value is not set to the ToOff-associated section in the delay time setting numeric box 311 (NO in step S2016), the processing proceeds to step S2008.

In step S2017, the CPU 426 adds, to the second <IrCutFilterAutoAdjustment> tag included in the SetImagingSettings command stored in the memory 428 in step S2001, a description corresponding to the <ResponseTime> tag in which the value determined to be set in step S2016 is set.

Accordingly, the <ResponseTime> tag in which the value determined to be set in step S2016 is set is associated with the second <IrCutFilterAutoAdjustment> tag in the SetImagingSettings command.

Referring to FIG. 22, in step S2018, the CPU 426 adds, to the SetImagingSettings command stored in the memory 428 in step S2001, descriptions corresponding to the <BoundaryType> tags with which the following values are associated. The values include Common, ToOn, and ToOff.

More specifically, in step S2018, the CPU 426 adds, to the SetImagingSettings command stored in the memory 428 in step S2001, descriptions corresponding to the following first, second, and third <IrCutFilterAutoAdjustment> tags.

The first <IrCutFilterAutoAdjustment> tag includes the <BoundaryType> tag with the value set to Common. The second <IrCutFilterAutoAdjustment> tag includes the <BoundaryType> tag with the value set to ToOn. The third <IrCutFilterAutoAdjustment> tag includes the <BoundaryType> tag with the value set to ToOff.

In step S2019, the CPU 426 determines whether a value is set to the D-Night setting-associated section in the BoundaryOffset setting numeric box 309. If the CPU 426 determines that a value is set to the D-Night setting-associated section in the BoundaryOffset setting numeric box 309 (YES in step S2019), the processing proceeds to step S2020.

On the other hand, if the CPU 426 determines that a value is not set to the D-Night setting-associated section in the BoundaryOffset setting numeric box 309 (NO in step S2019), the processing proceeds to step S2021.

In step S2020, the CPU 426 adds, to the first <IrCutFilterAutoAdjustment> tag included in the SetImagingSettings command stored in the memory 428 in step S2001, a description corresponding to the <BoundaryOffset> tag in which the value determined to be set in step S2019 is set.

Accordingly, the <BoundaryOffset> tag in which the value determined to be set in step S2019 is set is associated with the first <IrCutFilterAutoAdjustment> tag in the SetImagingSettings command.

In step S2021, the CPU 426 determines whether a value is set to the ToOn-associated section in the BoundaryOffset setting numeric box 309. If the CPU 426 determines that a value is set to the ToOn-associated section in the BoundaryOffset setting numeric box 309 (YES in step S2021), the processing proceeds to step S2022.

On the other hand, if the CPU 426 determines that a value is not set to the ToOn-associated section in the BoundaryOffset setting numeric box 309 (NO in step S2021), the processing proceeds to step S2023.

In step S2022, the CPU 426 adds, to the second <IrCutFilterAutoAdjustment> tag included in the SetImagingSettings command stored in the memory 428 in step S2001, a description corresponding to the <BoundaryOffset> tag in which the value determined to be set in step S2021 is set.

Accordingly, the <BoundaryOffset> tag in which the value determined to be set in step S2021 is set is associated with the second <IrCutFilterAutoAdjustment> tag in the SetImagingSettings command.

In step S2023, the CPU 426 determines whether a value is set to the ToOff-associated section in the BoundaryOffset setting numeric box 309. If the CPU 426 determines that a value is set to the ToOff-associated section in the BoundaryOffset setting numeric box 309 (YES in step S2023), the processing proceeds to step S2024.

On the other hand, if the CPU 426 determines that a value is not set to the ToOff-associated section in the BoundaryOffset setting numeric box 309 (NO in step S2023), the processing proceeds to step S2025.

In step S2024, the CPU 426 adds, to the third <IrCutFilterAutoAdjustment> tag included in the SetImagingSettings command stored in the memory 428 in step S2001, a description corresponding to the <BoundaryOffset> tag in which the value determined to be set in step S2023 is set.

Accordingly, the <BoundaryOffset> tag in which the value determined to be set in step S2023 is set is associated with the third <IrCutFilterAutoAdjustment> tag in the SetImagingSettings command.

In step S2025, the CPU 426 determines whether a value is set to the Common-associated section in the delay time setting numeric box 311. If the CPU 426 determines that a value is set to the Common-associated section in the delay time setting numeric box 311 (YES in step S2025), the processing proceeds to step S2026.

On the other hand, if the CPU 426 determines that a value is not set to the Common-associated section in the delay time setting numeric box 311 (NO in step S2025), the processing proceeds to step S2027.

In step S2026, the CPU 426 adds, to the first <IrCutFilterAutoAdjustment> tag included in the SetImagingSettings command stored in the memory 428 in step S2001, a description corresponding to the <ResponseTime> tag in which the value determined to be set in step S2025 is set.

Accordingly, the <ResponseTime> tag in which the value determined to be set in step S2025 is set is associated with the first <IrCutFilterAutoAdjustment> tag in the SetImagingSettings command.

In step S2027, the CPU 426 determines whether a value is set to the ToOn-associated section in the delay time setting numeric box 311. If the CPU 426 determines that a value is set to the ToOn-associated section in the delay time setting numeric box 311 (YES in step S2027), the processing proceeds to step S2028.

On the other hand, if the CPU 426 determines that a value is not set to the ToOn-associated section in the delay time setting numeric box 311 (NO in step S2027), the processing proceeds to step S2029.

In step S2028, the CPU 426 adds, to the second <IrCut-FilterAutoAdjustment> tag included in the SetImagingSettings command stored in the memory 428 in step S2001, a description corresponding to the <ResponseTime> tag in which the value determined to be set in step S2027 is set.

Accordingly, the <ResponseTime> tag in which the value determined to be set in step S2027 is set is associated with the second <IrCutFilterAutoAdjustment> tag in the SetImagingSettings command.

In step S2029, the CPU 426 determines whether a value is set to the ToOff-associated section in the delay time setting numeric box 311. If the CPU 426 determines that a value is set to the ToOff-associated section in the delay time setting numeric box 311 (YES in step S2029), the processing proceeds to step S2030.

On the other hand, if the CPU 426 determines that a value is not set to the ToOff-associated section in the delay time setting numeric box 311 (NO in step S2029), the processing proceeds to step S2008.

In step S2030, the CPU 426 adds, to the third <IrCutFilterAutoAdjustment> tag included in the SetImagingSettings command stored in the memory 428 in step S2001, a description corresponding to the <ResponseTime> tag in which the value determined to be set in step S2029 is set.

Accordingly, the <ResponseTime> tag in which the value determined to be set in step S2029 is set is associated with the third <IrCutFilterAutoAdjustment> tag in the SetImagingSettings command.

In the above-described exemplary embodiment, the IRCF 4 is used. However, that is not a restrictive one. An optical filter such as a neutral density (ND) filter may be used in place of the IRCF 4. The ND filter is a filter used to reduce the amount of light from an object without affecting the color characteristics of a video signal output from the image sensor 6.

Furthermore, the present invention can be implemented by performing the following processing. The processing includes supplying software (a program) for implementing the functions of the above-described exemplary embodiment to a system or an apparatus via a network or any type of storage medium, and allowing a computer (or a CPU or a micro processing unit (MPU)) of the system or the apparatus to read and execute the program.

The present invention can provide an effect to provide an imaging apparatus capable of performing, at appropriate timing, high-sensitivity shooting, such as high-gain shooting, and infrared shooting with the infrared cut filter retracted.

Other Embodiments

Embodiments of the present invention can also be realized by a computer of a system or apparatus that reads out and executes computer executable instructions recorded on a storage medium (e.g., non-transitory computer-readable storage medium) to perform the functions of one or more of the above-described embodiment(s) of the present invention, and by a method performed by the computer of the system or apparatus by, for example, reading out and executing the computer executable instructions from the storage medium to perform the functions of one or more of the above-described embodiment(s). The computer may comprise one or more of a central processing unit (CPU), micro processing unit (MPU), or other circuitry, and may include a network of separate computers or separate computer processors. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD) (trademark), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2013-053594 filed Mar. 15, 2013, which is hereby incorporated by reference herein in its entirety.

REFERENCE SIGNS LIST

2 Imaging optical system
4 Infrared cut filter (IRCF)
6 Image sensor
14 Communication circuit
24 IRCF driving circuit

The invention claimed is:

1. An imaging apparatus that communicates with an external apparatus via a network, the imaging apparatus comprising:
an imaging optical system;
an infrared cut filter that cuts off infrared light;
an image sensor configured to capture an image of an object formed by the imaging optical system; and
at least one processor that operates to:
insert and retract the infrared cut filter into and from an optical path of the imaging optical system;
increase gain of a video signal output from the image sensor by use of a means other than retracting the infrared cut filter from the optical path of the imaging optical system;
receive, from the external apparatus via the network, an adjustment command in which adjustment information about insertion and retraction of the infrared cut filter is described, the adjustment information being describable separately or in common for a case where the infrared cut filter is inserted into the optical path and a case where the infrared cut filter is retracted from the optical path; and
control the increase of the pain of the video signal and the insertion and retraction of the infrared cut filter at respectively different timing based on the adjustment command received by the at least one processor.

2. The imaging apparatus according to claim 1, wherein, in the adjustment command, the adjustment information is describable in common for both the case where the infrared cut filter is inserted into the optical path and the case where the infrared cut filter is retracted from the optical path.

3. The imaging apparatus according to claim 2, wherein the adjustment command is a command to cause the imaging apparatus to automatically control insertion and retraction of the infrared cut filter via the at least one processor.

4. The imaging apparatus according to claim 3, wherein, in a case where the adjustment command in which the adjustment information is described separately for the respective cases is received by the at least one processor, the at least one processor controls the increase of the gain based on the adjustment information described for the case where the infrared cut filter is retracted from the optical path.

5. The imaging apparatus according to claim 3, wherein, in a case where the adjustment command in which the adjustment information is described separately for the respective cases is received by the at least one processor, the at least one processor controls the increase of the gain based on the adjustment information described for the case where the infrared cut filter is inserted into the optical path.

6. The imaging apparatus according to claim 3, wherein, in a case where the adjustment command in which the adjustment information is described in common for both the cases is received by the at least one processor, the at least one processor controls the increase of the gain based on the adjustment information.

7. The imaging apparatus according to claim 1, wherein the adjustment information includes a brightness of the object or an elapsed time indicating a time elapsed since the brightness falls below a predetermined threshold.

8. A client apparatus that communicates, via a network, with an imaging apparatus including an imaging optical system, an infrared cut filter that cuts off infrared light, an image sensor configured to capture an image of an object formed by the imaging optical system, and at least one processor that operates to: insert and retract the infrared cut filter into and from an optical path of the imagine optical system, increase gain of a video signal output from the image sensor by use of a means other than retracting the infrared cut filter from the optical path of the imaging optical system, and control the increase of the gain of the video signal and the insertion and retraction of the infrared cut filter at respectively different timing, the client apparatus comprising:
at least one processor that operates to:
transmit, to the imaging apparatus via the network, an adjustment command in which adjustment information about insertion and retraction of the infrared cut filter is described,
wherein the adjustment command to be transmitted by the at least one processor of the client apparatus is a command in which the adjustment information is describable separately or in common for a case where the infrared cut filter is inserted into the optical path and a case where the infrared cut filter is retracted from the optical path, and is a command required for the at least one processor of the imaging apparatus to control the increase of the gain of the video signal and the insertion and retraction of the infrared cut filter at respectively different timing.

9. The client apparatus according to claim 8, further comprising a user interface configured to allow a user to input the adjustment information,
wherein the adjustment information input by the user is described in the adjustment command to be transmitted by the at least one processor of the client apparatus.

10. The client apparatus according to claim 9, wherein the at least one processor of the client apparatus further operates to acquire insertion and retraction descriptive information about the adjustment information from the imaging apparatus via the network,
wherein the user interface allows the user to input the adjustment information based on the insertion and retraction descriptive information acquired by the at least one processor of the client apparatus.

11. The client apparatus according to claim 10, wherein the insertion and retraction descriptive information acquired by the at least one processor of the client apparatus is able to indicate that the adjustment information is described, in the adjustment command to be transmitted by the at least one processor of the client apparatus, separately for the case where the infrared cut filter is inserted into the optical path and the case where the infrared cut filter is retracted from the optical path.

12. The client apparatus according to claim 10, wherein the insertion and retraction descriptive information acquired by the at least one processor of the client apparatus is able to indicate that the adjustment information is described, in the adjustment command to be transmitted by the at least one processor of the client apparatus, in common for both the case where the infrared cut filter is inserted into the optical path and the case where the infrared cut filter is retracted from the optical path.

13. The client apparatus according to claim 9, wherein the user interface allows the user to input the adjustment information in common for both the case where the infrared cut filter is inserted into the optical path and the case where the infrared cut filter is retracted from the optical path.

14. The client apparatus according to claim 9, wherein the user interface allows the user to input the adjustment information separately for the case where the infrared cut filter is inserted into the optical path and the case where the infrared cut filter is retracted from the optical path.

15. An imaging system comprising an imaging apparatus and a client apparatus that communicates with the imaging apparatus via a network, the imaging apparatus comprising:
an imaging optical system;
an infrared cut filter that cuts off infrared light;
an image sensor for capturing an image of an object formed by the imaging optical system; and
at least one processor that operates to:
insert and retract the infrared cut filter into and from an optical path of the imaging optical system;
increase gain of a video signal output from the image sensor by use of a means other than retracting the infrared cut filter from the optical path of the imaging optical system; and
control the increase of the pain of the video signal and the insertion and retraction unit of the infrared cut filter at respectively different timing,
the client apparatus comprising:
at least one processor that operates to:
transmit, to the imaging apparatus via the network, an adjustment command in which adjustment information about insertion and retraction of the infrared cut filter is described, wherein the adjustment command to be transmitted by the at least one processor of the client apparatus is a command in which the adjustment information is describable separately for a case where the infrared cut filter is inserted into the optical path and a case where the infrared cut filter is retracted from the optical path, and
wherein the at least one processor of the imaging apparatus controls the increase of the gain of the video signal and the insertion and retraction of the infrared cut filter at respectively different timing based on the adjustment command transmitted by the at least one processor of the client apparatus.

16. A method for controlling an imaging apparatus that communicates with an external apparatus via a network and that includes an imaging optical system, an infrared cut filter that cuts off infrared light, an image sensor configured to capture an image of an object formed by the imaging optical system, and at least one processor that operates to: insert and retract the infrared cut filter into and from an optical path of the imaging optical system, and a increase gain of a video signal output from the image sensor by use of a means other than retracting the infrared cut filter from the optical path of the imaging optical system, the method comprising:
- receiving, from the external apparatus via the network, an adjustment command in which adjustment information about insertion and retraction of the infrared cut filter is described, the adjustment information being describable separately for a case where the infrared cut filter is inserted into the optical path and a case where the infrared cut filter is retracted from the optical path; and
- controlling the increase of the gain of the video signal and the insertion and retraction of the infrared cut filter at respectively different timing based on the received adjustment command.

17. An imaging apparatus that communicates with an external client apparatus via a network, the imaging apparatus comprising:
- an imaging optical system;
- an imaging sensor configured to capture an image of an object formed by the imaging optical system and generate a video signal; and
- at least one processor that operates to:
- perform high-sensitivity shooting on an object with low brightness;
- insert and retract an infrared cut filter into and from an optical path of the imaging optical system;
- receive, from the external client apparatus via the network, an automatic insertion and retraction control command that causes the imaging apparatus to automatically control insertion and retraction of the infrared cut filter by the at least one processor and automatic adjustment information on insertion and retraction of the infrared cut filter by the at least one processor; and
- automatically control the insertion and retraction of the infrared cut filter and the high-sensitivity shooting based on the automatic insertion and retraction control command and the automatic adjustment information received by the at least one processor,
- wherein the automatic adjustment information includes one or both of first automatic adjustment information to deal with a case where the infrared cut filter is inserted into the optical path of the imaging optical system and second automatic adjustment information to deal with a case where the infrared cut filter is retracted from the optical path of the imaging optical system, and third automatic adjustment information to be used in common for both inserting and retracting the infrared cut filter into and from the optical path of the imaging optical system, the at least one processor being configured to automatically control the insertion and retraction of the infrared cut filter based on one or both of the first automatic adjustment information and the second automatic adjustment information, and the at least one processor being configured to automatically control the high-sensitivity shooting based on the third automatic adjustment information.

18. The imaging apparatus according to claim 17, wherein the high-sensitivity shooting is performed in one or combination of some of a high-color-signal-gain shooting mode for setting a high gain of a color signal and performing shooting, an accumulation time control shooting mode for controlling a photoelectric accumulation time of an image sensor and performing shooting, and a plural-frame-addition shooting mode for adding data of a same pixel over a plurality of frames and performing shooting.

19. An imaging apparatus connected to an external client apparatus via a network, the imaging apparatus comprising:
- an imaging optical system;
- an imaging sensor configured to capture an image of an object formed by the imaging optical system at normal sensitivity or high sensitivity;
- an infrared cut filter configured to cut off infrared light; and
- at least one processor that operates to:
- insert and retract the infrared cut filter into and from an optical path of the imaging optical system;
- receive automatic adjustment information on insertion and retraction of the infrared cut filter from the external client apparatus via the network;
- automatically control the insertion and retraction of the infrared cut filter and the imaging sensor based on the automatic adjustment information received by the at least one processor; and
- transmit boundary type information on the automatic adjustment information to the external client apparatus via the network,
- wherein the high sensitivity is higher than the normal sensitivity, and
- wherein the boundary type information transmitted by the at least one processor indicates whether insertion and retraction of the infrared cut filter into and from the optical path of the imaging optical system by the at least one processor and shooting at the high sensitivity by the imaging sensor are performed in combination with each other.

* * * * *